(12) United States Patent
Salminen

(10) Patent No.: US 8,961,739 B2
(45) Date of Patent: Feb. 24, 2015

(54) METHOD AND APPARATUS FOR THE SPLITTING OF CELLULOSIC FIBERS, METHODS FOR THE TREATMENT OF FIBROUS PULPS FOR A PAPERMAKING PROCESS, METHODS FOR PAPER DRYING AND PAPER PRODUCTS WITH SPLIT FIBERS

(76) Inventor: Reijo K. Salminen, Bellingham, WA (US)

(*) Notice: Subject to any disclaimer, the term of this patent is extended or adjusted under 35 U.S.C. 154(b) by 0 days.

(21) Appl. No.: 13/994,526

(22) PCT Filed: Dec. 16, 2011

(86) PCT No.: PCT/FI2011/051123
§ 371 (c)(1),
(2), (4) Date: Sep. 17, 2013

(87) PCT Pub. No.: WO2012/080579
PCT Pub. Date: Jun. 21, 2012

(65) Prior Publication Data
US 2014/0000823 A1    Jan. 2, 2014

Related U.S. Application Data

(60) Provisional application No. 61/423,781, filed on Dec. 16, 2010.

(51) Int. Cl.
*D21B 1/08* (2006.01)

(52) U.S. Cl.
USPC ............ 162/4; 162/5; 162/6; 162/60; 162/61

(58) Field of Classification Search
USPC ............ 162/4, 5, 6, 60, 65, 61, 189, 190, 29, 162/70, 78, 90
See application file for complete search history.

(56) References Cited

U.S. PATENT DOCUMENTS 5,785,810 A * 7/1998 Salminen ..................... 162/60

* cited by examiner

*Primary Examiner* — Mark Halpern
(74) *Attorney, Agent, or Firm* — Birch, Stewart, Kolasch & Birch, LLP

(57) ABSTRACT

A method of splitting hollow cellulosic fibers employs the steps of wetting the fibers, feeding the wet fibers to a gaseous flow, and conducting the gaseous flow carrying the fibers through a venturi tube, the pressure drop in the venturi tube throat bringing a pressure difference between liquid inside the fibers and gas outside of the fibers and causing the fibers to split in their longitudinal direction, to open the lumen inside the fibers.

25 Claims, 14 Drawing Sheets

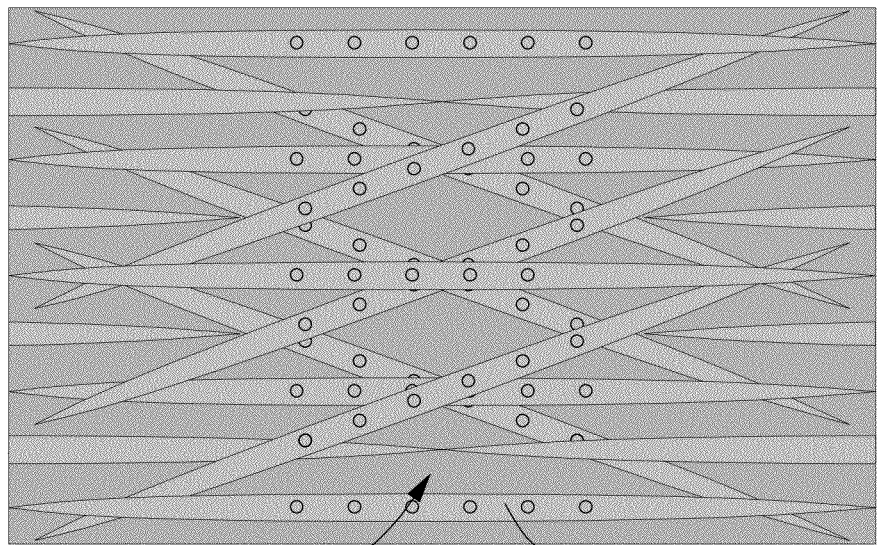
430a  FIG. 18  431
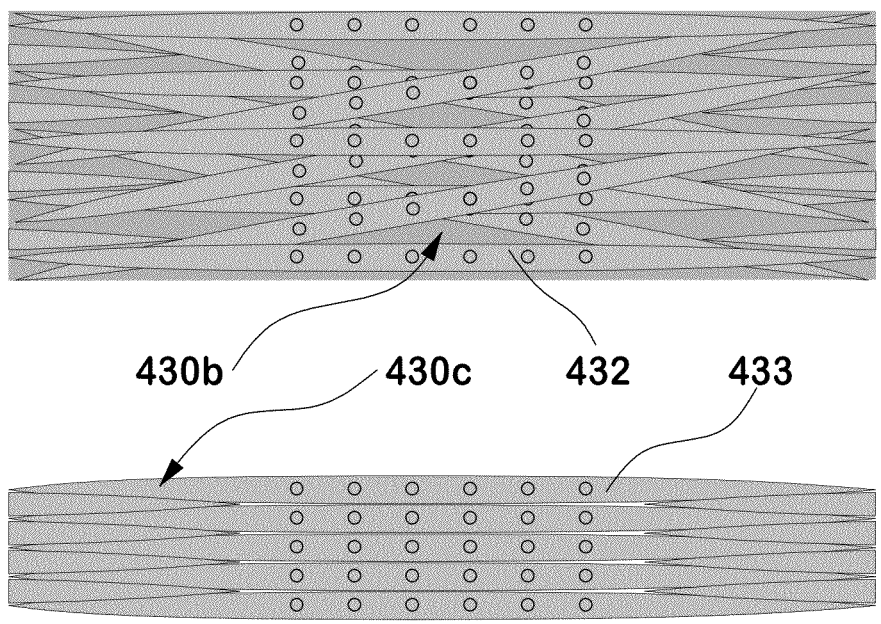
430b  430c  432  433

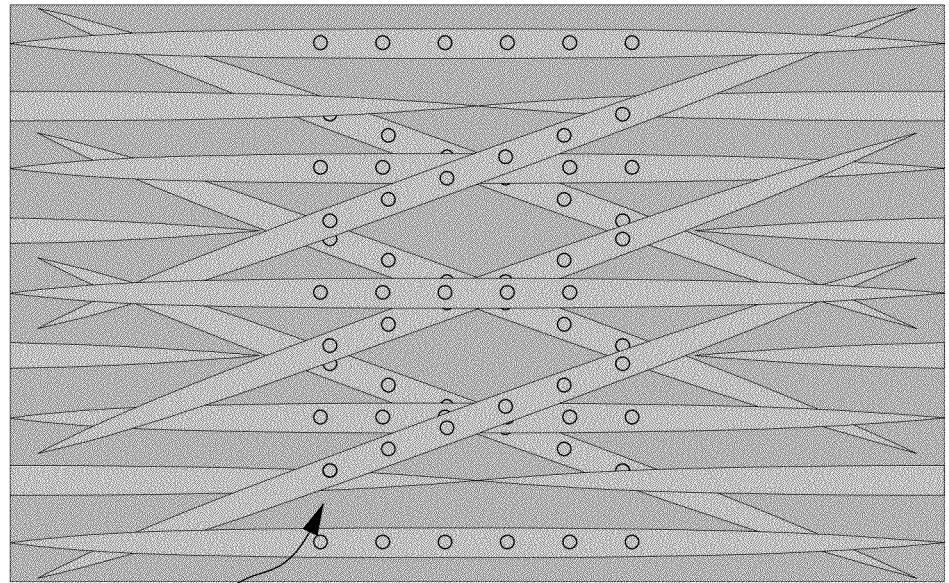
430a  FIG. 20  430g
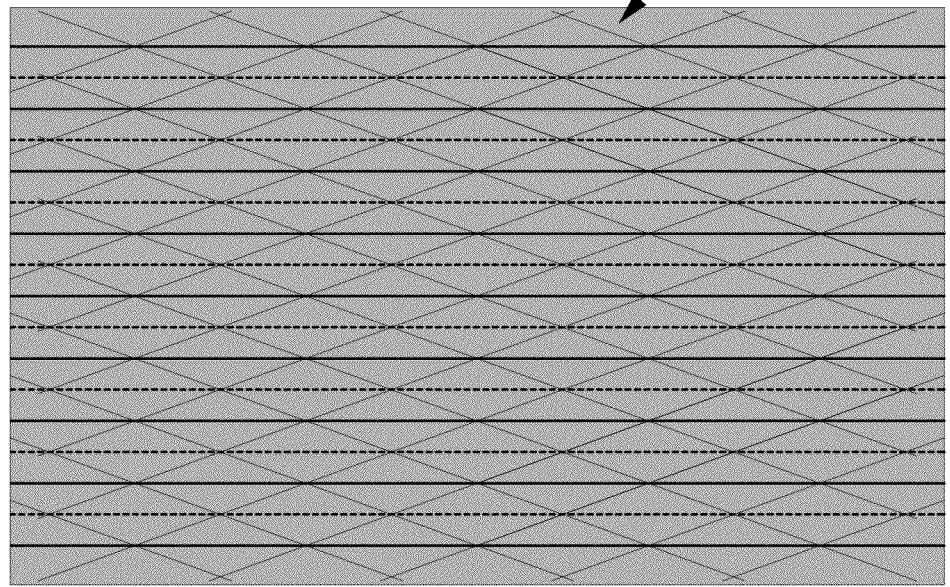

METHOD AND APPARATUS FOR THE SPLITTING OF CELLULOSIC FIBERS, METHODS FOR THE TREATMENT OF FIBROUS PULPS FOR A PAPERMAKING PROCESS, METHODS FOR PAPER DRYING AND PAPER PRODUCTS WITH SPLIT FIBERS

RELATED APPLICATIONS

The present application is a 371 of International PCT Application No. PCT/FI2011/051123 filed Dec. 16, 2011.

PCT Application No. PCT/FI2011/051123 claims priority benefit of U.S. Provisional Application Ser. No. 61/423,781, filed Dec. 16, 2010.

The contents of all related applications cited above are incorporated herein by reference.

TECHNICAL FIELD

The present invention relates to a method and an apparatus for the longitudinal splitting of hollow cellulosic fibers. Further objects of the invention are a method of washing fibrous pulp, methods for the bleaching of fibrous pulp, methods for the chemical treatment of fibrous pulp, a method for the deinking of recycled paper, methods for the pretreatment of fibrous pulp or recycled paper for papermaking, methods for the preparation of dried paper, and finished paper products comprising longitudinally split fibers.

BACKGROUND

Fiber Morphology

In the pulp and paper industry all processing apparatuses and methods are influenced by the pulp characteristics, which derive particularly from fiber morphology, population, length, coarseness, coarseness to length ratio, wall thickness and diameter, and fiber types to list the most important ones.

Fiber morphology is the key element that influences the pulp characteristics. Up to now the paper industry has not given fiber morphology full consideration as regards pulp processing and papermaking.

Among the most important aspects that affect the morphology of the fibers are the species of the trees or non-wood plants that are processed into pulp. The huge difference between hardwood or softwood pulps is best illustrated by the consistent difference in their fiber populations. Thus fines-free softwood market pulps range from 2.3 to 5.2 million fibers/g, while fines-free hardwood pulps range from 9.8 to 27.6 million fibers/g. In terms of fiber length, the average length-weighted fiber length of softwood chemical pulps range from 1.8 to 2.7 mm, while the shorter hardwoods range from 0.58 to 1.1 mm. These data show that softwood fibers are, on average, approximately 2.5 times longer than hardwood fibers. There is a sharp difference in the paper structure that these two groups of pulp produce, and in fact most papers are made from a mixture of hardwood and softwood pulps.

Another major aspect of fibrous pulp is coarseness, a measure of how much fiber wall material there is in a fiber per unit-length of that fiber. Since the fiber wall densities of market chemical pulps do not differ greatly, coarseness can be visualized as the solid cross-sectional area of the fiber wall. Once more a significant difference between softwood and hardwood fibers is evident. Coarseness values for the softwoods range from 13.7 to 27.5 mg/100 m, while hardwoods range from 6.9 to 12.6 mg/100 m.

The relationship of fiber diameter and wall thickness affects the tendency of the fiber to collapse. Fibers with the same coarseness, but different diameters, will have different collapsing tendencies. A good example of this difference can be seen by comparing a 100% aspen NBHK, and a SBMHK, "Southern Bleached Mixed Hardwood Kraft" pulp. They have nearly the same coarseness values (10.1 versus 10.6 mg/100 m), but the aspen pulp fibers have a larger diameter and a thinner wall than the southern mixed hardwood fibers. As a result, the aspen pulp collapses readily and therefore requires only a third as much refining to form a sheet with the same density as the southern hardwood pulp.

Pulp fines are generally considered to be detrimental to pulp properties because they don't contribute significantly to sheet strength and they displace longer fibers, they lower freeness and impede the drainage on the paper machine, they aren't easily retained on the paper machine wire, they tend to produce paper surfaces prone to picking and dusting, and they have a high specific surface area that attracts a disproportionate amount of additives.

There is another category of fines, called secondary fines that are fragments of fibers and fiber walls. Secondary fines result from fiber damage in wood chip production and transport, pulping, mixing and refining. Secondary fines, within some reasonable limits, are generally considered beneficial for sheet strength, opacity and surface properties.

As regards non-wood pulps, cotton linters pulps are nearly pure cellulose fibers produced from second-cut cotton linters. The distribution of fiber lengths, average fiber length (1.45 mm), coarseness (19.1 mg/100 m) and fiber population (5.5 million/g) position this pulp's gross morphology as being similar to short softwood. From a strength potential perspective, the nearly pure cellulose severely limits hydration and bonding potential. As a consequence refining has little influence on strength development and, while these pulps are quite durable and stable, they are not used to make strong papers without being combined with other fibers and/or bonding additives.

Three other non-wood pulps belong to the category of pulps with very uneven fiber length distribution and quite different fiber types. Bamboo, kenaf and bagasse pulps have very similar fiber length (~1.1 mm), but their coarseness values, which are 9.3, 12.5 and 17.9 mg/100 m respectively, cover a fairly broad range. All three pulps have at least two very distinct fiber types, namely a long, relatively thick-walled fiber much like softwood latewood fiber, and a large diameter thin-walled short fiber.

Wood Cell Structure

Another difference between softwoods and hardwoods is that softwoods are dominated by one fiber type, the tracheid, while hardwoods have fiber tracheids and vessel elements. The vessel elements specialize in vertical transportation of water in the tree trunk. Each vessel consists of vessel elements that are cylindrical cells with open ends. They are connected longitudinally to form pipe structures. All hardwoods have vessels in the range of 10% to 50% of their volume, depending on species. Vessel elements of some hardwood species are extremely large in diameter compared to their fibers. In addition to having more fiber types, the volume that the fiber types occupy, and their size and shape, is more varied in hardwoods.

In softwoods the tracheids are 90+% of the wood volume and 94+% of the pulp mass. In contrast, the hardwood fiber tracheid volume ranges from 40 to 70%, while the vessel elements occupy 10 to 40% of the wood.

There is a third group of small cells, namely the ray tracheids in softwoods and the ray and axial parenchyma in hardwoods. Ray cells constitute less than 10% of the volume of softwoods, but the parenchyma cells in hardwoods can be up to 40% of the wood volume and more than 20% of the mass of a market pulp. These very small cells are commonly referred to as primary fines.

To illustrate the ultrastructure of typical softwood cells reference is made to FIG. 1 The main cell (fiber) type is the axially aligned tracheid (TR) 302. Other cell types in softwoods are the fusiform wood ray (FWR) and wood ray (WR) cells 304, and the longitudinal and epithelial parenchyma cells, which are the cells surrounding the horizontal (HRO) 306 and vertical (VRO) 308 resin ducts.

A simplified structure of a cylindrical woody cell, i.e. a wood fiber, comprises the middle lamella (ML) 312, the primary wall (P) 314, the outer (81) 316, middle (82) 318, and inner (83) 320 layers of the secondary wall, and the warty layer (W) 322.

The warty layer 322 is a thin, typically 0.1 micron thick, amorphous membrane located in the inner surface of the cell wall. In the inner layer 320 the direction 10 of the micro-fibrils is nearly perpendicular to that in the middle layer 318. The void space inside the inner layer 320 is called lumen 321 and its diameter is typically in the 20 micron range.

The middle layer 318, typically 3 micron thick, forms the main portion of the cell wall. The micro-fibrils are oriented in bands (lamellae) nearly parallel to the cell axis.

In the outer layer 316, typically 0.2 micron thick, the micro-fibril groups are in helixes alternately crossed. The fibrils have great tensile strength, which renders the outer layer 316 capable of extreme resistance to swelling of the interior layers of the fiber wall.

In the outer portion of the primary wall 314 the micro-fibrils form an irregular network. In the interior they are oriented nearly perpendicular to the cell axis. In the presence of reagents (e.g. white liquor), which induce strong swelling, the primary wall 314, typically 0.1 micron thick, is peeled off and the belts around the fibers expand (balloon).

The middle lamella 312 is located between the cells and serves the function of binding the cells together. It consists typically of 90% lignin, 10% of hemicelluloses, and little, if any, of cellulose.

In softwoods, liquid is transferred from rays 304 to tracheids 302 and between tracheids 302 through tiny voids called bordered pits (BP) 310 in the cell walls. Typically the bordered pits 310 are only in one single row aligned with the longitudinal axis of the cell.

To give some perspective of the weight each cell type and their layers represent in a virgin softwood cell structure, typically the percentages are in descending order as follows: middle layer 318 67%, middle lamella 312 15%, wood rays 304 and resin ducts 306 and 308 (including resins) 8%, outer layer 316 5%, primary wall 314 3%, and inner layer 320 2%.

Pulping

The major types of fibrous pulps produced today are chemical pulps made by digesting, thermomechanical pulps (TMP) made by heat and mechanical defibrillation and chemi-mechanical and chemi-thermomechanical pulps (CMP and CTMP) made by mechanical refining with use of heat and/or chemicals. Chemical pulping has a low yield and the pulps are rather expensive. Mechanical pulps are rather weak and yield lower-quality although cheaper paper products compared with chemical pulps. Ultra-high-yield chemi-mechanical (CMP) pulps and chemi-thermo-mechanical (CTMP) pulps represent alternatives, which combine high yield, low cost, and fewer pollution problems while achieving good mechanical properties. The only major drawback of CMP/CTMP pulps is their relatively high defibrillation energy.

The production of CMP or CTMP generally comprises the steps of chip sulfonation with a sodium sulfite mixture (NaHS03/Na2S03/NaOH) and high-consistency refining at atmospheric or higher pressure.

Explosion pulping is an ultra-high-yield pulping process based on short time vapor-phase cooking at temperatures in the range of 180 to 21 OOC, followed by explosive decompression.

It is generally accepted that the chemical treatment is mainly responsible for permanent fiber softening and increases in long fiber content, fiber specific surface, and conformability. Treatment of chips with steam at high temperature, followed by explosive decompression, also contributes to the softening of the fibers. Moreover, the explosive decompression of treated chips leads to a reduction in energy consumption in subsequent refining stages.

Explosion pulping was invented by Mason (1928) in the early 1930s. In this process, the chips are fed from a chip bin through a screw loading valve in a masonite gun. The chips are then steam heated at a very high temperature, about 285OC, and at a pressure of 3.5 MPa for about 2 min. The pressure is increased rapidly to about 7 MPa for about 5 s, and the chips are then discharged through restricted orifices (slotted port) and explode at atmospheric pressure into a pulp. Two stages of low-consistency atmospheric refining result in a dark pulp of about 75% yield suitable for the manufacture of high-density fiberboard. This process is very effective as a means of fiber separation with low energy consumption. However, the masonite pulp is very coarse in texture and dark in color. The fibers are mostly un-collapsed, rigid, and degraded and display a highly lignin-rich surface structure, which is unsuitable for papermaking.

Scanning electron micrographs and microscopic studies of fibers produced by explosion pulping have demonstrated a clear separation in the middle lamella. It is known that the surface of explosion pulp contains numerous large pores with evidence of considerable ultra-structural rearrangements. Fragments of cell wall form more or less spherical particles, primarily from lignin. During the action of organic solvents or other delignifying agents, the lignin particles swell, then their structure is destroyed, and finally they move from the liquid phase and disappear from the fiber structure.

Steam explosion pulping (SEP) was suggested as an alternative to CMP/CTMP processes in the early 1990s because of the reduced refining energy required for the SEP pulp. A much higher temperature is used (180-210° C.) as compared with that used in conventional CMP/CTMP processes (120-150° C.) and a shorter time. Moreover, the cook is terminated by a sudden pressure release.

Paper recycling is the process of recovering waste paper, pulping the paper and turning it into new paper products. There are three categories of paper that can be used as feed stocks for making recycled paper, namely mill broke, pre-consumer waste, and post-consumer waste. Mill broke is paper trimmings and other paper scrap from the manufacture of paper, and is recycled internally in a paper mill. Pre-consumer waste is material which left the paper mill but was discarded before it was ready for consumer use. Post-consumer waste is material discarded after consumer use, such as corrugated containers, magazines, newspapers, office paper, telephone directories etc.

Pulp Processing

The most usual processes fibrous wood or non-wood pulps are subjected to washing, bleaching, chemical treatments of the pulp, refining, drying, and papermaking. Recycled fibrous wood or non-wood pulps are subjected to deinking, bleaching, refining and papermaking.

Pulp washing aims at the removal of residual digesting or bleaching liquor from the pulp. Washing apparatuses include diffusion washers, rotary drum washers, horizontal belt filters, wash presses and dilution/extraction washing stages. The method used in diffusion washers is to displace in a tank the spent liquor between the fibers with cleaner wash liquor, typically at 5-10% pulp consistency range. The method used in drum and belt-washers is to first dewater the pulp slurry as much as possible, typically to 10-15% pulp consistency range, and then use wash liquor for displacement of the remaining spent liquor. In the method with wash presses the spent liquor is squeezed out from between the fibers, typically to 25-35% pulp consistency range, while some wash liquor is introduced during the pressing.

All these displacement washing methods displace spent liquor only from the space outside and between the pulp fibers, but leave practically all spent liquor inside the fiber lumen. Some leaching of the inside bound liquor happens during the dilution/extraction stages between multiple washing steps in series. However, a substantial amount of spent liquor, typically 1.5-2 times the weight of the fibers, is still carried over inside the hollow fiber lumen to the next processing stage.

Bleaching of pulp fibers is done with chemicals in gaseous or liquid form. One or more bleaching stages are required to achieve desired result. Each bleaching stage is accomplished at a preferred pulp consistency, temperature, pressure, time duration, and chemical concentration.

Each bleaching stage is followed by a washing stage to remove the dissolved organic matter and the bleaching chemicals to minimize the carry-over to the next bleaching stage. In bleaching typically only one washing step is used per stage. Again, the displacement wash leaves a substantial amount of already dissolved organic matter and bleaching chemicals inside the fiber lumen. This carry-over consumes and thereby wastes some of the newly added chemicals in the next bleaching stage.

In general, recycled pulp can be bleached with the same chemicals used to bleach virgin pulp, but hydrogen peroxide and sodium hydrosulfite are the most common bleaching agents.

The industrial process of removing printing ink from paper fibers of recycled paper to make deinked pulp is called deinking. Many newsprint, toilet paper and facial tissue grades commonly contain 100% deinked pulp and in many other grades, such as lightweight coated for offset and printing and writing papers for office and home use, deinked pulp makes up a substantial proportion of the furnish.

In the fast-growing digital printing market, a noteworthy development is the introduction of commercial inkjet web presses for on-demand newspapers and various publications and business forms. However, inkjet inks are generally not de-inkable and are, therefore, incompatible with paper recovery and recycling. Ten percent is a reasonable estimate for the percentage of inkjet-printed paper that a mill can tolerate.

Very small and hydrophilic ink pigments are generally easily dislodged from the fiber surface during pulping. The mechanical action imparted to the pulp in a repulper, however, causes the small ink pigments to enter into the lumen via pit apertures where they deposit irreversibly on the surface of fiber lumen.

Some end products in chemical pulping require additional chemical treatment after the conventional bleaching stages. For instance, mercerized pulps are produced by post-treatment of steeping a bleached pulp in caustic to swell the fibers, to remove hemicelluloses and to render the pulp inert as far as strength development from refining is concerned. Market pulps are used to produce cellulose derivatives including sodium carboxyl methyl cellulose (CMC), hydroxyl ethyl cellulose (HEC), methyl ethyl cellulose (MEC) and cellulose diacetate.

Dissolving pulps having uniform intrinsic viscosity, also measured as degree of polymerization, undergo a process that reduces it to syrup that can be further processed into cellophane film and fibers for rayon, acetate and other man-made fibers.

Refining or beating of chemical pulps is the mechanical treatment and modification of fibers so that they can be formed into paper or board of the desired properties. The main target of refining is to improve the bonding ability of fibers so that they form strong and smooth paper sheet with good printing properties.

Refining affects fibers by cutting and shortening of fibers, fines production, removal of parts from fiber walls, external fibrillation, delamination, internal fibrillation, swelling, curling, creating kinks etc., and dissolving or leaching out colloidal material into the external liquor. As a result of the above effects, fibers after refining are collapsed (flattened) and made more flexible, and their bonding surface area is increased.

Production of market pulp as well as various types of paper and board products requires drying of the final product. Most market pulp is air dried (90% fiber, 10% water) and compressed into bales or in some cases the pulp mat is split and rewound into rolls. Two basic systems are employed in the production of dry market pulp: the conventional system, and the flash-drying system.

The conventional system of producing dry market pulp parallels conventional papermaking: a thick pulp mat is formed with a Fourdrinier wet end, most remaining free water between the fibers is removed mechanically in the press section, and evaporative drying is employed with either a steam-heated cylinder dryer or an air-float dryer section.

Flash or spray drying refers to the process whereby the fibrous material is introduced as a spray or an analogous form into a stream of hot gases. The high-temperature heat content of the gas stream causes flashing of moisture to vapor.

However, the entrapped water in the lumen immediately turns to steam (one cc of water becoming 1700 cc of steam), creating an internal explosion. The water in the fiber's wall and interior lumen evaporates, causing the fiber to shrink and contract. Each fiber reacts to this explosion in varying ways, depending on the structural weaknesses along the length of the fiber. These inherent weaknesses create knuckles in the fibers' shape. Along with the knuckles the fibers develop a characteristic curly shape and become convoluted. These misshapen fibers have made flash-dried pulps recognized as being ideally suited to the needs of those mills producing filter papers and latex-saturated paper and board.

In drying a sheet of paper two basic physical processes are involved, heat transfer and mass transfer. Heat is transferred from some source such as steam to the wet sheet in order to provide the energy required to drive the moisture from the sheet. The moisture evaporates and is then transferred from the sheet to the surrounding atmosphere by the mass transfer process. Multicylinder drying is the most common way in the paper and paperboard industry.

SUMMARY

As discussed above in the chapter "wood cell structure", wood as well as non-wood fibers comprise tracheids, having a cylindrical shell surrounding a hollow lumen and closed ends. Only small bordered pit holes along a longitudinal line in the tracheids allow passage of liquids in and out of the fiber lumen. In softwoods the tracheids are 90+% of the wood volume and 94+% of the pulp mass, whereas hardwood fiber tracheid volume ranges from 40 to 70%, while the vessel elements occupy 10 to 40% of the wood.

The tracheids remain closed through all the present technology processing steps in the pulp and paper industry from digesting through washing, bleaching and drying. Only in mechanical refining of chemical pulp, for improving paper sheet formation and its strength characteristics, some fiber cell walls are opened, but due to concomitant cutting of the fibers refining is used only to a limited extent leaving most of the tracheids closed.

The closed tracheids create a number of problems to a broad range of the pulp and paper industry processes. For pulp washing, only the free liquid outside between the fiber cells is washable to recover the dissolved organic matter and chemicals in the spent cooking liquor, or to remove the dissolved organic matter and spent bleaching chemicals from the pulp before the next bleaching or final drying stage. For pulp bleaching, all bound liquid inside the closed fiber lumen carries already dissolved organic matter and spent cooking or bleaching chemicals into the next stage. This carry-over consumes fresh bleaching chemicals leaving less for further bleaching reactions in the cell wall. Also, the closed cylindrical fiber wall allows the bleaching chemicals access to the desired organic matter, mainly lignin, and in specialty pulps also the hemicelluloses, in the cell wall only through the outside wall surface. The miniscule open area of the bordered pit holes does not allow practically any transfer of bleaching chemicals into the fiber lumen and simultaneously transfer of any dissolved organic matter out of the same holes.

All bound liquid inside the closed fiber lumen, after the unbleached pulp washer or after the last bleach plant washer, carries already dissolved organic matter, spent cooking liquor, or bleaching chemicals into the market pulp or paper mill pulp storage chest. There some of the bound liquid has time to leach out from the fiber lumen into the free wash liquid of the last washing stage surrounding the fibers.

In case of market pulp drying the wet end filtrate from the sheet formation before the pulp dryer carries a large COD load, the leached amount, into the pulp mill effluent system. Any dissolved organic matter and chemicals that were not leached out of the fibers will be carried with the market pulp to the customers mill, where it eventually will add to that mill's COD load after repulpers and the refining action free most of the remaining carry-over to the mill's effluent system.

For recycled paper, there are a variety of undesirable materials bound inside the fibers, such as ink particles, paper filler materials, glue, dissolved organic matter, digesting and bleaching chemicals etc. All these undesirable materials are carried over in the bound liquid inside the fiber lumen to the final end products.

For drying, the closed fiber structure with lumen filled with liquid retards and adds to the burden of removing the liquid from pulp or paper mechanically or by evaporation. This bound liquid is a major factor behind the massive pressing and drying sections of the present-day paper and board machines, and the high energy consumption for obtaining the final dried product.

The present invention has the aim of solving the problems as discussed above by longitudinal splitting of the cylindrical hollow cellulosic fibers in a controlled manner, thereby opening the lumen inside the fiber for the various operations in the pulp and paper industry. According to a first aspect of the invention, a method of splitting the fibers comprises the steps of (i) wetting the fibers, (ii) feeding the wet fibers to a gaseous flow, and (iii) conducting the gaseous flow carrying the fibers through a venturi tube, so that (iv) the pressure drop in the venturi tube throat brings a pressure difference between the inside and the outside of the fibers and causes the fibers to split in their longitudinal direction.

According to a second aspect of the invention, an apparatus for splitting the fibers comprises (i) a flow channel for conducting a gaseous flow, said flow channel issuing in a venturi tube, (b) a container for fibers in a wetted condition, (c) means for pressurizing said container, and (iv) supply means for feeding the wet fibers from said container to said flow channel upstream of the venture tube.

According to a third aspect of the invention, a method of washing fibrous pulp comprises the steps of (i) feeding wet cellulosic fibers of the pulp to an above atmospheric pressure gaseous flow, (ii) conducting the gaseous flow carrying the fibers through a venturi tube, so that (iii) the pressure drop in the venturi tube brings a pressure difference between the inside and the outside of the hollow cellulosic fibers and causes the fibers to split in their longitudinal direction, and (iv) subjecting the longitudinally split fibers to treatment with washing liquors.

According to a fourth aspect of the invention, a method for the bleaching of fibrous pulp comprises the steps of (i) feeding wet cellulosic fibers to an above atmospheric pressure gaseous flow, (ii) conducting the gaseous flow carrying the fibers through a venturi tube, (iii) the pressure drop in the venturi tube bringing a pressure difference between the inside and the outside of the hollow cellulosic fibers and causing the fibers to split in their longitudinal direction, and (iv) subjecting the longitudinally split fibers to treatment with bleaching chemicals.

As a modification of the method according to the fourth aspect above, at least one bleaching chemical can be fed to the gaseous flow together with the wet fibers, so that the bleaching chemical is present already at the moment of splitting the fibers and can affect the lumen, i.e. the inside wall of the fiber immediately.

As another modification the treatment may be a chemical treatment other than bleaching, using respective chemical reactants for affecting the fibers opened by longitudinal splitting.

Furthermore, the method may be used for deinking of recycled paper, which starts with repulping the paper to obtain fibers in a wetted condition, followed by the steps for splitting the fibers as brought forward above, and final treatment of the split fibers to remove the ink particles by washing.

According to a fifth aspect of the invention, a method for the pretreatment of recycled paper for papermaking comprises the steps of (i) repulping the paper to obtain cellulosic fibers in a wet condition, (ii) feeding the wet fibers to an above atmospheric pressure gaseous flow, (iii) conducting the gaseous flow carrying the fibers through a venturi tube, (iv) the pressure drop in the venturi tube bringing a pressure difference between the inside and the outside of the fibers and causing the fibers to split in their longitudinal direction, and (v) subjecting the longitudinally split fibers to cleaning by removal of glue and/or organic or inorganic filler materials freed from the inside of the fiber lumen.

According to a sixth aspect of the invention, a method for the pretreatment of fibrous pulp for a papermaking process comprises the steps of (i) wetting the hollow cellulosic fibers of the pulp, (ii) feeding the wet fibers to an above atmospheric pressure gaseous flow, (iii) conducting the gaseous flow carrying the fibers through a venturi tube, (iv) the pressure drop in the venturi tube bringing a pressure difference between the inside and the outside of the fibers and causing the fibers to split in their longitudinal direction, and (v) bringing the longitudinally split fibers to a furnish for supply to the wet end forming fabric of a papermaking machine.

By use of the longitudinally split fibers for papermaking there are substantial advantages to be gained in the drying of the paper, including changes in the drying section of the papermaking machine. These advantages will be discussed in the next chapters below. Another important advantage is that the freeness of the paper can be reduced while the strength of the finished paper product is preserved as the controlled splitting does not cut the fibers in the longitudinal direction. The fiber splitting according to the invention thus forms a useful substitute for conventional refining, which aims at reducing the freeness but is handicapped by its tendency to cut the fibers shorter and thereby weaken the final paper.

According to a seventh aspect of the invention, a method for the preparation of dried paper comprises the steps of (i) wetting hollow cellulosic fibers, (ii) feeding the wet fibers to an above atmospheric pressure gaseous flow, (iii) conducting the gaseous flow carrying the fibers through a venturi tube, (iv) the pressure drop in the venturi tube bringing a pressure difference between the inside and the outside of the fibers and causing the fibers to split in their longitudinal direction, (v) bringing the longitudinally split fibers to a furnish, (vi) supplying the furnish to the wet end forming fabric of a papermaking machine, (vii) forming a fibrous web on said forming fabric, (viii) pressing the fibrous web for removal of water in the pressing section of said papermaking machine, and (ix) drying the fibrous web on a sequence of steam heated drying cylinders in the drying section of said papermaking machine.

Splitting of the fibers frees the water and brings it into direct contact with the surfaces of the drying cylinders, thus adding to the efficiency of drying and allowing the drying section of the papermaking machine to be drastically shortened. The contact between liquid water and drying cylinder surface may be maintained substantially at each one of the cylinders in the sequence. This is in sharp contrast with the present-day drying processes, in which such direct contact is lost in the course of the drying, the latter drying stages seeking to remove residual water and moisture from the lumen of the un-split fibers through the fiber cell wall. Such conventional drying requires a progressively increasing temperature and vapor pressure along the sequence of drying cylinders as each dry fiber builds up an insulating layer on both outside surfaces of the paper to resist heat transfer into the wetter interior of the paper sheet. Consequently the cost savings won by the invention are remarkable.

According to a preferred embodiment the cylinders at the opposite ends of the drying sequence have vapor pressures that stand in a relation of at most 2 to 1, preferably at most 1.5 to 1, to each other. The invention may even allow a substantially equal vapor pressure to be maintained within each cylinder of the drying sequence. A suitable vapor pressure within each cylinder of said sequence may be 4 bar at most, preferably within the range of 3 to 4 bar. In comparison, in conventional drying processes dealing with predominantly unsplit fibers and therefore predominantly bound water inside the fibers said relation between the initial and the final vapor pressures in the sequence of cylinders is typically about 3 to 1, increasing from about 3 bar in the wet end cylinders to about 8-10 in the dry end cylinders.

In terms of temperature, a suitable temperature on the surface of each cylinder of the sequence may be 150° C. at most, preferably about 135 to 145° C., while the steam temperature inside the dry end cylinders in prior art is typically in the 180° C. range.

According to an eighth aspect of the invention, there is provided a paper product comprising at least one fibrous layer, in which at most 50% of the fibers have a hollow cylindrical unsplit configuration, the rest of the fibers having been split in their longitudinal direction. Preferably the share of such unsplit fibers is at most 10%, and most preferably substantially all of the fibers in the at least one fibrous layer are split in their longitudinal direction. The paper product may be made by use of the pretreated fibrous pulp made in accordance with the sixth aspect of the invention discussed above. In prior art papers based on conventionally refined pulps, failing to fulfill the characteristics of the present invention, refining has cut the fibers shorter but has not markedly changed their hollow cylindrical configuration.

The paper according to the invention may consist of a single layer, or it may be a multilayer paper, there being a separate headbox and forming fabric for each of the layers in the papermaking machine. In case of a multilayer paper at least one layer and preferably each one of the layers has at least 50%, preferably at least 90%, and most preferably substantially all of the fibers split in their longitudinal direction.

In papermaking it is possible to prepare a furnish exclusively from a pulp pretreated according to the invention to comprise longitudinally split fibers, or by blending such pretreated pulp with a conventional pulp of un-split fibers. In this way the share of split fibers in each paper layer may be controlled if desired. The invention benefits pulp washing by making all liquor bound inside the fiber lumen at the previous treatments, such as cooking liquors or bleaching chemicals, washable to recover the dissolved organic matter and chemicals in the spent liquor. Washing away any cooking liquors prevent undesirable carry-over of such liquors to a subsequent bleaching or other chemical treatment stage.

At the same time the displacement washing process is made more efficient, reducing the number of washing steps and use of washing water.

There is no dissolved organic matter or spent process chemicals carried over in bound liquid inside the fiber lumen as residues contaminating a final pulp product such as market pulp. When used for papermaking the pulp has no COD load carried over into the paper mill effluent system.

Regarding the bleaching the benefits are quite similar. Bleaching chemicals have an immediate access to the opened inside of the longitudinal fibers, and harmful carry-over of chemicals to the next processing step in a typically multistep bleaching process is avoided. The consumption of bleaching chemicals is reduced and the entire process is simplified together with reduction of the bleaching pressure, temperature, time and the amount of chemicals used, and even the number of the bleaching steps in some cases can be reduced.

The longitudinally split fiber wall thus allows effective removal of the target organic matter, mainly lignin, and for specialty pulps also the hemicelluloses, from both sides of the fiber cell wall. In case of recycled paper the variety of undesirable materials bound inside the recycled fibers, such as ink particles, paper filler materials, glue, dissolved organic matter, digesting and bleaching chemicals etc. are immediately accessible to removal after the fibers are split longitudinally.

Since splitting the fiber wall longitudinally open is an efficient refining action in itself, very little, if any, mechanical refining is necessary to form a strong and smooth paper sheet with good printing properties. This reduces the continuous weakening of recycled fibers due to repeated refining actions.

Splitting the fiber wall longitudinally open is also an efficient refining action in itself, resulting in better paper or board properties than the conventional mechanical refining can produce. The main target of refining, to improve the bonding ability of fibers, is improved by 65-70 percent due to doubled contact surface area for bonding between the individual fibers. All the negative mechanical refining effects are eliminated, such as no cutting and shortening of fibers, no fines production, no curling of the fibers, no nodes, kinks, slip planes, or micro-compressions in the cell wall are created.

For pulp and paper drying the longitudinally opened fiber structure is a major advantage, allowing more effective removal of residual moisture by pressing and by heated cylinders. Especially the paper or board machine drying section may be made shorter and less massive with reduced energy consumption. As conventional market pulp is used for papermaking, the splitting of the fibers according to the invention is a useful pretreatment to be carried out before the preparation of the aqueous furnish, bringing the advantages in the pressing and drying sections of the machine.

Since the volumetric flow is the same in both the flow channel upstream of the venturi tube and the substantially reduced cross sectional area in the venturi throat, the average velocity of the gas and fiber mixture must increase as it passes through the throat. Therefore, the gas pressure drops according to Bernoulli's conservation of energy equation. The point of smallest flow cross section in a venturi tube is termed the "vena contracta", and corresponds to the point of lowest pressure. It can be sized small enough to drop the entering gas or steam vapor pressure even to half of its original value in a fraction of a second as the gas and fiber mixture passes through the vena contracta.

For controlled splitting of the fibers in the venturi throat the pressure difference between the outside and the inside of the hollow fibers must be sufficient to split the fibers longitudinally, like a pea pod, while preventing an uncontrolled explosive splitting that would rupture the fiber shells and weaken the mechanical strength of the pulp. The pressure in the gaseous flow, which also prevails in the liquid inside the fibers, may be in the range of 1 to 20 bar, preferably 5 to 10 bar. The selection of this operating pressure is dependent on many variables such as the desired flow velocity through the venturi throat, size of the feed fiber particles, fiber moisture, discharge line back pressure, production capacity, and transporting gas. The preferred transporting gases are compressed air and steam, the latter being more lubricating than the former and cheaper to produce.

A sudden pressure drop occurs as the gas together with the fibers flows through the venturi throat, and due to the closed structure of the fibers a corresponding pressure difference is suddenly created between the opposite sides of the fiber wall. The magnitude of the pressure drop, as well as the pressure difference that causes the fiber to split, is governed by the geometry of the venturi throat. The venturi throat may constrict the flow to a cross-sectional area of 2 to 40%, preferably 5 to 10% of the cross-section of the flow channel upstream of the venturi tube. The pressure downstream of the venturi tube is by necessity lower that upstream of the same, preferably the normal atmospheric pressure.

For example, if both the gas flow pressure and the liquid pressure inside the fiber lumen are 8 bars upstream of the venturi tube, the gas pressure surrounding the fibers may drop to 4 bars in the venturi throat, while the liquid pressure in the interior of the fiber lumen is still 8 bars. The 4 bar pressure difference is sufficient to break the fiber cell wall along a longitudinal line where the cell wall is the weakest. Since the liquid inside the fiber lumen is a non-compressible and non-flashing fluid its pressure is released immediately to the pressure of the surrounding gas when the fiber shell splits. No changes to the fiber morphology have been found to take place other than the longitudinal split.

An apparatus according to the invention may comprise a container defining a pressure chamber (first embodiment) or an atmospheric feed chamber (second embodiment), which chambers contain the wet pulp fibers, and a flow channel receiving the fibers and carrying them in an above atmospheric pressure gaseous flow to the venturi tube. There are means to pressurize the pressure chamber to an above atmospheric pressure level. Input means are provided to supply wet pulp fibers into the pressure chamber or feed chamber in a continuous manner. The pressure chamber is operated as a batch process where its pressure is relieved to load a new batch of wet pulp fibers and then repressurized for operation. The atmospheric feed chamber is operated as a continuous process where a rotary valve between the feed chamber and the pressurized flow chamber maintains a good air/steam lock between the chambers.

The pressurized flow channel may be provided with a gas or steam vapor entrance pipe and issues in a discharge venturi tube section. Input means are provided to feed the pressurized flow chamber with above atmospheric pressure gas or steam vapor as well as with wet pulp fibers from the pressure chamber (first embodiment) or feed chamber (second embodiment). Discharge means are provided to let the pressurized gas or steam and fiber mixture flow through a venturi tube into a receiving tank, e.g. an atmospheric pressure cyclone chamber for fiber and gas or steam separation.

In the preferred form the consistence of the wet pulp fed from the pressure container to the flow channel is maintained in the 5 to 50% range, more preferably in the range of 15 to 30%.

In a ninth example, the present invention may be embodied as a method of splitting hollow cellulosic fibers, comprising the following steps: wetting the fibers; feeding the wet fibers to a gaseous flow; conducting the gaseous flow carrying the fibers through a venturi tube; the pressure drop in the venturi tube throat bringing a pressure difference between liquid inside the fibers and gas outside of the fibers and causing the fibers to split in their longitudinal direction, to open the lumen inside the fibers. In this ninth example, wet fibers may be fed to an above atmospheric pressure gaseous flow.

In a first implementation of the ninth example, the fibers may be brought into a liquid suspension of 5 to 50% consistency and fed to said gaseous flow under pressure.

In this first implementation of the ninth example, the fibers may be brought into a liquid suspension, the suspension may be compressed by means of compressed air or steam, the suspension may be dewatered to a consistency range of 5 to 50%, preferably of 15 to 30%, and the wet fibers may be fed to said gaseous flow under pressure. Alternatively, in the first implementation of the ninth example, the fibers in a liquid suspension may be dewatered to a consistency range of 5 to 50%, preferably of 15 to 30%, fed alternatively to a plurality of atmospheric pressure tanks, which are pressurized alternatively to above atmospheric pressure with compressed air, and the wet fibers may be fed to the said gaseous flow as a batch process, where one tank is being filled with wet fibers while another is being pressurized or depressurized and yet another tank is being emptied of wet fibers into the said gaseous flow.

In any implementation of the ninth example, said gaseous flow may be air or steam, the gaseous flow together with the wet fibers may be discharged through the venturi tube to an atmospheric pressure, the pressure inside the fibers before entering the throat of the venturi tube may be in the range of 1 to 20 bar, preferably of 5 to 10 bar, the fibers may be pressurized in a liquid suspension to a pressure in the range of 1 to 20 bar, preferably of 5 to 10 bar, the gaseous flow at the throat of the venturi tube may be constricted to a cross-sectional area of 2 to 40%, preferably of 5 to 10%, of the flow cross-section upstream of the venturi tube, and/or the fibers may be selected from the group consisting of unbleached or bleached chemical pulp, unbleached or bleached CTMP or TMP, and recycled fibrous material.

In a tenth example, the present invention may be embodied as an apparatus for the splitting of hollow cellulosic fibers, comprising a flow channel for conducting a gaseous flow, said flow channel issuing in a venturi tube; a container for fibers in a wetted condition; means for pressurizing said container; and supply means for feeding the wet fibers from said container to said flow channel upstream of the venturi tube. In this tenth example, the apparatus may further comprise a container defining a pressure chamber for fibers in a wetted condition; means for the supply of the wet fibers to said container; means for pressurizing said container; a flow channel for conducting a gaseous flow; supply means for feeding the wet fibers from said container to the gaseous flow in said flow channel; a venturi tube downstream of said flow channel, bringing a pressure drop and a pressure difference between liquid inside and gas outside of the hollow fibers carried by the gaseous flow, and causing the fibers to split in their longitudinal direction, to open the lumen inside the fibers; and a receiving tank downstream of the venturi tube, for collecting the longitudinally split fibers. In any embodiment of the tenth example, the throat of the venturi tube may have a cross-sectional area of 2 to 40%, preferably of 5 to 10% of the cross-sectional area of the flow channel upstream of the venturi tube.

In an eleventh example, the present invention may be embodied as a method of washing fibrous pulp, comprising the following steps: feeding wet cellulosic fibers of the pulp to an above atmospheric pressure gaseous flow; conducting the gaseous flow carrying the fibers through a venturi tube; the pressure drop in the venturi tube bringing a pressure difference between liquid inside and gas outside of the hollow cellulosic fibers and causing the fibers to split in their longitudinal direction, to open the lumen inside the fibers; and subjecting the longitudinally split fibers to treatment with washing liquors. In this eleventh example, the fibrous pulp may be unbleached chemical pulp from a cooking process or unbleached CTMP or TMP. In this eleventh example, the fibrous pulp may be bleached chemical pulp, bleached CTMP or TMP, or bleached recycled pulp.

In a twelfth example, the present invention may be embodied as a method for the bleaching of fibrous pulp, comprising the following steps: feeding wet cellulosic fibers to an above atmospheric pressure gaseous flow; conducting the gaseous flow carrying the fibers through a venturi tube; the pressure drop in the venturi tube bringing a pressure difference between liquid inside and gas outside of the hollow cellulosic fibers and causing the fibers to split in their longitudinal direction, to open the lumen inside the fibers; and subjecting the longitudinally split fibers to treatment with bleaching chemicals.

In a thirteenth example, the present invention may be embodied as a method for the bleaching of fibrous pulp, comprising the following steps: feeding wet cellulosic fibers and at least one bleaching chemical to an above atmospheric pressure gaseous flow; conducting the gaseous flow carrying the fibers through a venturi tube; the pressure drop in the venturi tube bringing a pressure difference between liquid inside and gas outside of the hollow cellulosic fibers and causing the fibers to split in their longitudinal direction, to open the lumen inside the fibers; and allowing the at least one bleaching chemical to react with the longitudinally split fibers.

In either the twelfth example or the thirteenth example, unbleached cellulosic pulp from a cooking process, unbleached CTMP or TMP, or unbleached recycled pulp may be washed and the fibers of the pulp in a wetted condition may be fed to said above atmospheric pressure gaseous flow. In this case, the washed pulp may be dewatered to a consistency range of 5 to 50%, preferably of 15 to 30%, and fed to said above atmospheric pressure gaseous flow under pressure.

In a fourteenth example, the present invention may be embodied as a method for the chemical treatment of a fibrous pulp comprising the following steps: feeding wet cellulosic fibers and at least one reactive chemical to an above atmospheric pressure gaseous flow; conducting the gaseous flow carrying the fibers through a venturi tube; the pressure drop in the venturi tube bringing a pressure difference be-tween liquid inside and gas outside of the hollow cellulosic fibers and causing the fibers to split in their longitudinal direction, to open the lumen inside the fibers; and allowing the at least one chemical to react with the longitudinally split fibers.

In a fifteenth example, the present invention may be embodied as a method for the pretreatment of fibrous pulp for a papermaking process comprising the following steps: wetting the hollow cellulosic fibers of the pulp; feeding the wet fibers to an above atmospheric pressure gaseous flow; conducting the gaseous flow carrying the fibers through a venturi tube; the pressure drop in the venturi tube bringing a pressure difference be-tween liquid inside and gas outside of the fibers and causing the fibers to split in their longitudinal direction, to open the lumen inside the fibers; and bringing the longitudinally split fibers to a furnish for supply to the wet end forming fabric of a papermaking machine. In this fifteenth example, dry pulp may be brought into an aqueous suspension, the suspension may be dewatered to a consistency range of 5 to 50%, preferably of 15 to 30%, and the wet fibers may be fed to said gaseous flow under pressure. In any implementation of the fifteenth example, the fibrous pulp may be unbleached or bleached chemical pulp, or unbleached or bleached CTMP or TMP. In any implementation of the fifteenth example, the fibrous pulp may comprise recycled cellulosic fibers.

In a sixteenth example, the present invention may also be embodied as a method for the deinking of recycled paper comprising the following steps of: repulping the paper to obtain cellulosic fibers in a wet condition; feeding the wet fibers to an above atmospheric pressure gaseous flow; conducting the gaseous flow carrying the fibers through a venturi tube; the pressure drop in the venturi tube bringing a pressure difference between liquid inside and gas outside of the fibers and causing the fibers to split in their longitudinal direction, to open the lumen inside the fibers; and subjecting the longitudinally split fibers to treatment to remove the ink particles.

In a seventeenth example, the present invention may be embodied as a method for the pretreatment of recycled paper for papermaking comprising the following steps: repulping the paper to obtain cellulosic fibers in a wet condition; feeding the wet fibers to an above atmospheric pressure gaseous flow; conducting the gaseous flow carrying the fibers through a venturi tube; the pressure drop in the venturi tube bringing a pressure difference between liquid inside and gas outside of the fibers and causing the fibers to split in their longitudinal direction, to open the lumen inside the fibers; and subjecting the longitudinally split fibers to cleaning by removal of glue and/or organic or inorganic filler materials freed from the inside of the fiber lumen.

In an eighteenth example, the present invention may be embodied as a method for the preparation of dried paper comprising the following steps: wetting hollow cellulosic fibers; feeding the wet fibers to an above atmospheric pressure gaseous flow; conducting the gaseous flow carrying the fibers through a venturi tube; the pressure drop in the venturi tube bringing a pressure difference between liquid inside and gas outside of the fibers and causing the fibers to split in their longitudinal direction, to open the lumen inside the fibers; bringing the longitudinally split fibers to a furnish; supplying the furnish to the wet end forming fabric of a papermaking machine; forming a fibrous web on said forming fabric; pressing the fibrous web for removal of water in the pressing section of said papermaking machine; and drying the fibrous web on a sequence of steam heated drying cylinders in the drying section of said papermaking machine. In this eighteenth example, a contact between liquid and the drying cylinder surface may be maintained substantially at each one of the cylinders in said sequence.

In any implementation of the eighteenth example, the cylinders at the opposite ends of said sequence may have vapor pressures in a relation of at most 2 to 1, preferably at most 1.5 to 1, to each other. In this case, a substantially equal vapor pressure may be maintained within each cylinder of said sequence. When the cylinders at the opposite ends of said sequence have vapor pressures as described in the preceding two sentences, the vapor pressure within each cylinder of said sequence may be at most 5 bar, preferably within the range of 3 to 4 bar. In any implementation of the eighteenth example, the temperature of the steam inside each cylinder of said sequence may be at most preferably within the range of 135 to 145° C.

The present invention may also be embodied as an example paper product comprising at least one fibrous layer, in which at most 50% of the fibers have a hollow cylindrical configuration, the rest of the fibers being split in their longitudinal direction. In this example paper product, at most 10% of the fibers in said fibrous layer may have a hollow cylindrical configuration, the rest of the fibers being split in their longitudinal direction. With a paper product of the preceding sentence, substantially all of the fibers in said fibrous layer may be split in their longitudinal direction. In any of these implementations of the example paper product described in this paragraph, at least one fibrous layer, preferably each fibrous layer, may have at least 50%, preferably at least 90%, of the fibers split in their longitudinal direction.

Other features of the present invention will be apparent from the following detailed description of preferred examples.

BRIEF DESCRIPTION OF THE DRAWINGS

FIG. 18 is a cross-section of a conventional sheet of paper under drying;

FIG. 20 corresponds to FIG. 18 but shows a sheet of paper according to the invention.

BRIEF DESCRIPTION OF THE TABLES

TABLE 1 shows the filling, pressurizing, emptying, and depressurizing sequences of the pressure chambers and the compressed air accumulator pressurizing air source;

TABLE 2 shows a laboratory report on testing of conventional un-split ECF bleached softwood pulp fibers;

TABLE 3 shows a laboratory report on testing of longitudinally split ECF bleached softwood pulp fibers; and TABLE 4 shows a laboratory report on testing of conventional unbleached softwood pulp fibers.

DETAILED DESCRIPTION

Description of the First Embodiment

It is believed that a clearer understanding of the present invention will be obtained by first describing somewhat briefly the main components of the apparatus of the first embodiment of the present invention, followed by a general description of its operation. After this there will be a more detailed description of the first embodiment and also more specifics of its operation. Then there will be descriptions of further embodiments.

a. Main Components of the Apparatus

Figure 1:
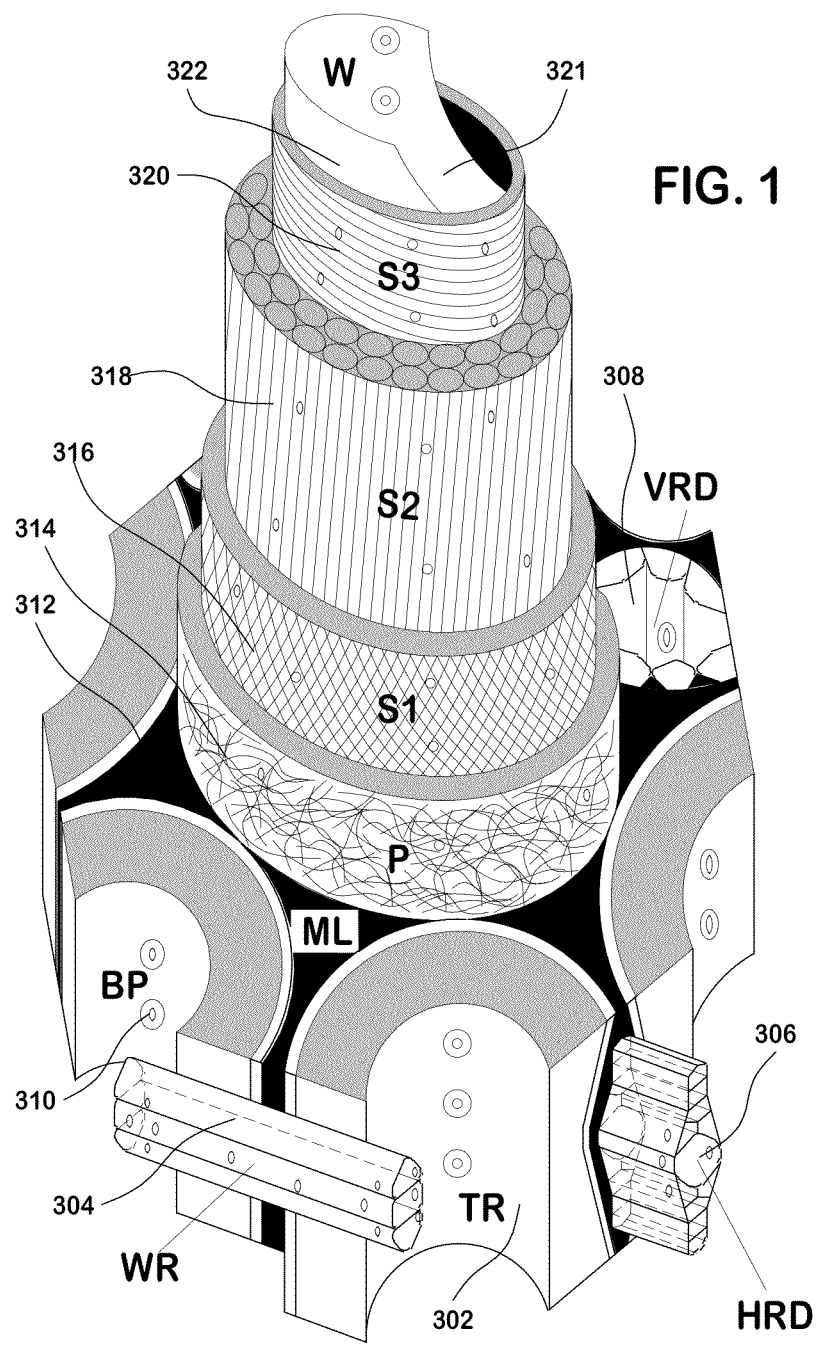
FIG. 1, already discussed in connection with the background of the invention, shows a diagram of the ultra structure of typical softwood cells.
Figure 2:
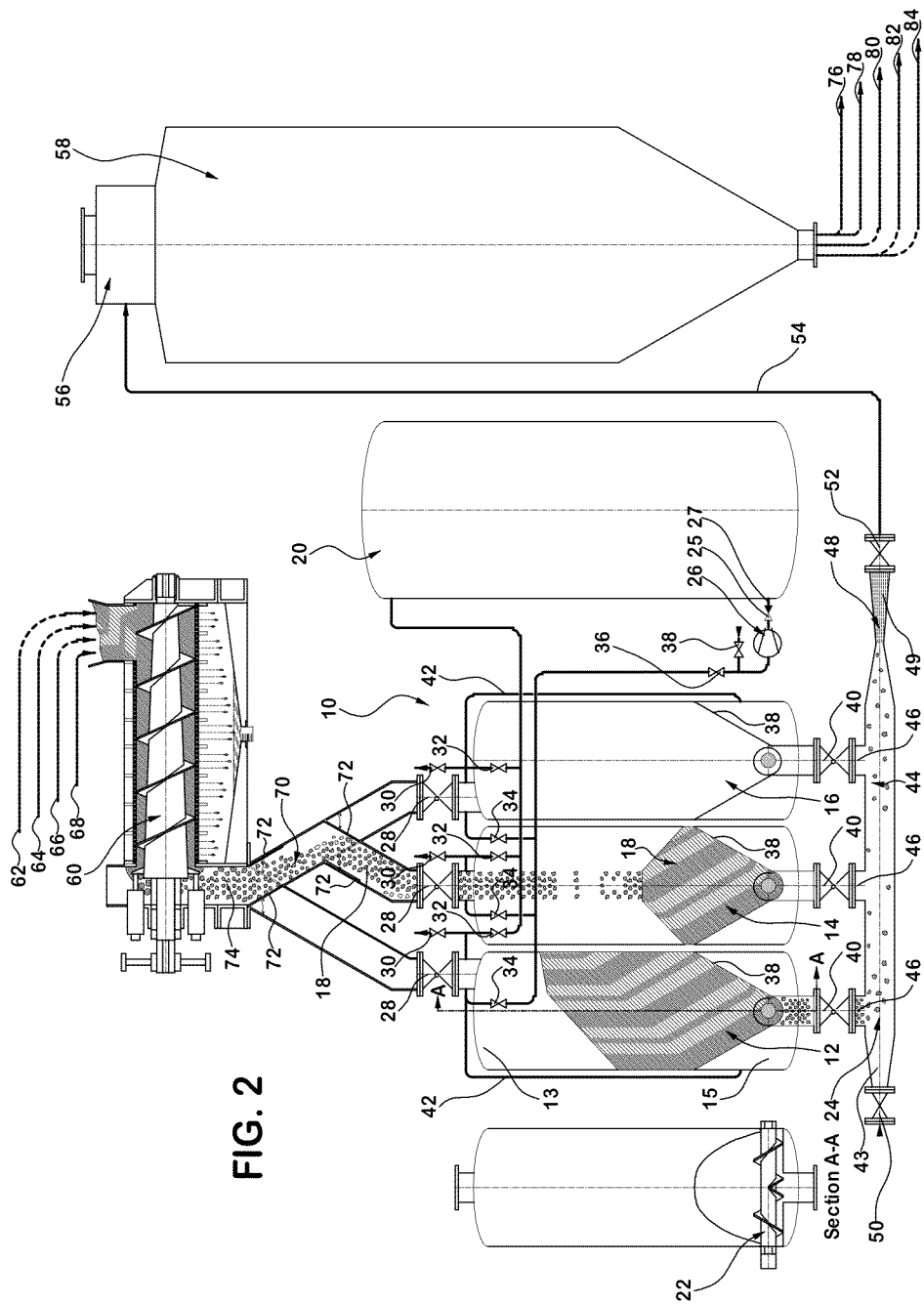
FIG. 2 is an assembly diagram of the apparatus of the first embodiment of the present invention.

With reference to FIG. 2, the apparatus of the first embodiment of the present invention comprises three pressure chambers for the wet pulp fibers, a compressed air accumulator for pressurizing the pressure chambers, a compressor for pressurizing the air accumulator, three mechanical feeders to ration out the pulp fibers from the pressure chambers, a pressurized flow chamber pipe assembly to receive the fibers through the mechanical feeders, a steam valve to feed and pressurize the pressurized flow chamber pipe assembly, and a venturi tube section and blow valve to discharge the fiber-air-steam mixture from the pressurized flow chamber pipe assembly.

The three pressure chambers are operated as a batch process, where one chamber is being filled with pulp fibers at atmospheric pressure, while the fibers in another chamber are being rationed out at the operating pressure into the flow chamber pipe assembly, and the third chamber is being either relieved of its operating pressure after all fibers have been rationed out or pressurized for operation after the chamber has been filled with fibers.

(b) General Description of the Apparatus

With reference to FIG. 2, the apparatus 10 of the present invention comprises three elongate pressure chambers 12, 14 and 16 which are alternatively filled with wet pulp fibers 18 at atmospheric pressure, then pressurized to operating pressure with compressed air from the compressed air accumulator 20, emptied from wet pulp fibers 18 through a rationing device 22 to the pressurized flow chamber 24, and finally depressurized to atmospheric pressure by use of compressor 26 to recover all pressurized air energy back to the compressed air accumulator 20. All three pressure chambers 12, 14 and 16 have an upper end 13 and lower end 15.

There are four valve connections to the upper end 13. Valve 28 controls the filling of wet pulp fibers 18 into the pressure chamber. Air bleed valve 30 enables the excess air in the pressure chamber to be displaced into the atmosphere by the incoming wet fibers during the filling phase. Pressurizing valve 32 is used to pressurize the pressure chamber to operating pressure with compressed air from the compressed air accumulator 20. Depressurizing valve 34 is used to recover the energy of the pressurized air in the pressure chamber back to the air accumulator 20 by use of the compressor 26 after the pressure chamber has been emptied of wet pulp fibers. On the suction side of the compressor 26 there are two valves; recycle valve 36 which is open when the pressure energy in any of the pressure chambers is being recovered, and; fresh air intake valve 38 for compressed air make-up when recycle valve 36 is closed. On the pressure side of the compressor 26 there is a check valve 25 in the line 27 between the compressor 26 and the air accumulator 20.

The lower end 15 comprises a false bottom funnel 38 to direct the wet pulp fibers 18 to the rationing device 22, and a discharge valve 40 to let the wet pulp fibers 18 into the pressurized flow chamber 24. A pressure equalizing pipe 42 connects the space under the false bottom funnel 38 to the upper end 13 of the pressure chambers 12, 14 and 16.

The apparatus 10 can be considered as having two main operating sections that cooperate with one another to accomplish the major functions of the present invention. First, there are the above described three pressure chambers 12, 14 and 16, and second, there is the pressurized flow chamber 24. The pressurized flow chamber 24 has two main sections; a pipe assembly 44 to receive the wet pulp fibers 18 alternatively through three nozzle locations 46 on the top of the pipe assembly 44 and; a venturi tube section 48. The inlet end 43 of the pipe assembly 44 is connected to a feed valve 50 for feeding and pressurizing the pressurized flow chamber 24 with gas or steam vapors. The discharge end 49 of the venturi tube section 48 is connected to a blow valve 52 to discharge the fiber-air-steam mixture from the pressurized flow chamber 24 through a blow line 54 into a cyclone 56 on top of a high density storage tank 58.

Figure 15:
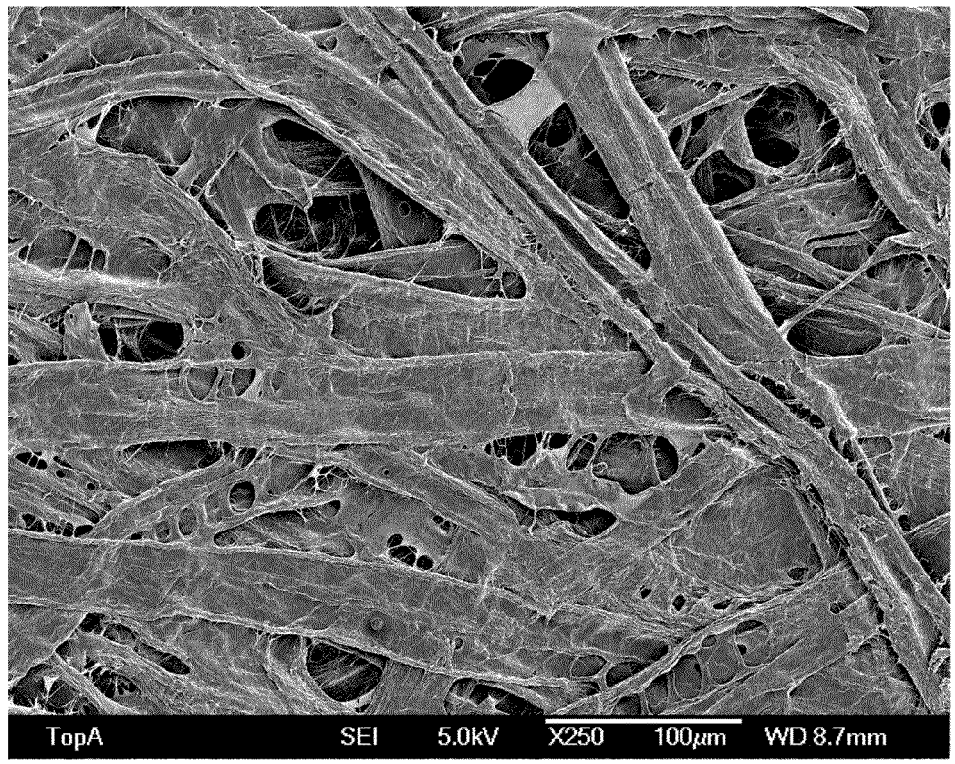
FIG. 15 shows the fiber structure of dried modified split-fiber-pulp paper of unbleached softwood pulp at magnification 250.

The apparatus 10 is supplied with wet pulp fibers typically at 25 to 30 percent consistency. FIG. 2 shows a typical thickening apparatus 60 in the form of a screw press. A pipeline 62 from a pulp storage tank or a pipeline 64 from a repulper feed the thickening apparatus 60 typically with 2 to 5 percent pulp slurry. A pipeline 66 from a decker or 68 from a pulp washer will supply the thickening apparatus 60 typically with pulp at 10 to 15 percent consistency. A chute assembly 70 distributes the thickened wet pulp fibers 18 alternatively into any of the three pressure chambers 12, 14 and 16. Actuator controlled baffle boards 72 are used to direct the wet pulp fibers 18 from the discharge end 74 of the thickening apparatus 60 into either pressure chamber 12, 14 or 16, whichever is in the filling phase of the operation. FIG. 15 shows that pressure chamber 14 is being filled.

In some instances there may be advantages to use lower feed consistencies, such as 10 to 25 percent or higher consistencies, such as 30 to 45 percent. When 10 to 15 percent feed consistency is desired then the pipeline 66 from the decker and/or 68 from a pulp washer can be used directly to feed the pressure chambers 12, 14 and 16 bypassing the thickening apparatus 60. Depending on what kind of pulp fibers are being processed with the apparatus of the present invention the processed pulp in the high density storage tank 58 will be diluted and pumped out either through line 76 to a rewasher, line 78 to screen room, line 80 to bleach plant, line 82 to refiners, or line 84 to a paper machine.

All carry-over chemicals and already dissolved organic matter in unbleached pulp can be recovered for recycling due to the longitudinal fiber split making the bound liquor inside the fiber lumen available for displacement washing in a rewasher. It follows that all carry-overs to any bleaching stage after the fiber split process will be practically nil after each intermediate washer in the bleach plant.

Screen room rejects and refiner energy consumption will be reduced substantially due to the longitudinal fiber split, and all bound ink particles inside the fiber lumen in recycled paper will be available for removal. Other benefits of the fiber split will be discussed in detail later. There will also be further descriptions of how conventional apparatuses and methods can be modified to utilize these benefits.

(c) Brief Description of the Overall Operation of the Invention

With the foregoing detailed description of the apparatus in mind, there will now be a brief description of the overall operation of the present invention.

The preferred range of the operating pressure in the pressurized flow chamber of the first embodiment is typically 5 to 10 bars. In some instances there may be advantages to use higher pressures, such as 10 to 20 bars. In some instances there may be advantages to use lower pressures, such as 1 to 5 bars. In such a case it is preferable to use the second embodiment of the present invention as described later below.

There are four separate phases in the operation of the present invention.

Emptying Phase

Initially, one of the three pressure chambers 12, 14 or 16 has been filled with wet pulp fibers 18, pressurized to operating pressure, and is being gradually emptied into the pressurized flow chamber 24.

FIG. 2 shows pressure chamber 12 at this phase of operation. Wet fiber filling valve 28, air bleed valve 30 and depressurizing valve 34 are all closed. Pressurizing valve 32 is open to maintain the operating pressure in pressure chamber 12 the same as the pressure in the pressurized flow chamber 24 by feeding compressed air from the accumulator 20. Feed valve 50 for feeding and pressurizing the pressurized flow chamber 24 with gas or steam vapor is open together with the blow valve 52 at the end of the venturi tube section 48. Discharge valve 40 at the lower end 15 of pressure chamber 12 is open and the rationing device 22 is turned on to feed the wet pulp fibers 18 into the gas or steam vapor stream in the pressurized flow chamber 24. This emptying phase of operation continues until the pressure chamber 12 is emptied of all wet pulp fibers 18.

Filling Phase

While pressure chamber 12 is being emptied, pressure chamber 14 is being filled with wet pulp fibers 18 from the chute assembly 70 under the thickening apparatus 60 as shown in FIG. 15. Discharge valve 40 at the lower end 15 of pressure chamber 14 is closed and the rationing device 22 is turned off. At the upper end 13 of pressure chamber 14 the wet fiber filling valve 28 and air bleed valve 30 are open while depressurizing valve 34 and pressurizing valve 32 are closed to maintain the pressure chamber 14 at atmospheric pressure. The open air bleed valve 30 lets the excess air out of the pressure chamber 14 as the air is being displaced by the volume of the wet pulp fibers 18 entering the pressure chamber 14. This filling phase of operation continues until the pressure chamber 14 is full with wet pulp fibers 18.

Depressurizing Phase

Once a pressure chamber is emptied it will be depressurized to atmospheric pressure. FIG. 2 shows pressure chamber 16 in such depressurizing phase. Discharge valve 40 at the lower end 15 of pressure chamber 16 is closed and the rationing device 22 is turned off. At the upper end 13 of pressure chamber 16 the wet fiber filling valve 28, air bleed valve 30 and the pressurizing valve 32 are closed and the depressurizing valve 34 and the recycle valve 36 at the suction side of the compressor 26 are open to recover all pressurized air energy from the pressure chamber 16 back to the compressed air accumulator 20 with the aid of compressor 26. The fresh air intake valve 38 is closed during the depressurizing phase. This depressurizing phase of operation continues until the pressure in the pressure chamber 16 is brought down to atmospheric pressure.

At this point the pressure chamber 16 is ready to begin the next filling phase. The depressurizing valve 34 and the recycle valve 36 at the suction side of the compressor 26 are closed and the fresh air intake valve 38 at the suction side of compressor 26 is opened to allow the compressor 26 to continue its compressed air make-up phase into the compressed air accumulator 20. As described in the filling phase section above, at the upper end 13 of pressure chamber 16 the wet fiber filling valve 28 and air bleed valve 30 are opened. When the previous pressure chamber 14 being filled with wet pulp fibers 18 is full then the baffle boards 72 in the chute assembly 70 are turned into such new positions that the wet pulp fibers 18 are directed from the thickening apparatus 60 into the chute feeding pressure chamber 16.

Pressurizing Phase

Once the pressure chamber 14 has been filled with wet pulp fibers 18 then its wet fiber filling valve 28 and air bleed valve 30 are closed. Pressurizing valve 32 is opened to raise the pressure in the pressure chamber 14 to the same operating pressure that is in the pressurized flow chamber 24. This completes the pressurizing phase and the pressure chamber 14 is now ready for the next emptying phase.

Timing of Operating Phases

TABLE 1 shows the timing of all the operating phases in a table format. Initially, pressure chamber 12 is filled with wet pulp fibers 18. Pressure chamber 14 filling starts when pressure chamber 12 is full, and then pressure chamber 16 filling starts when pressure chamber 14 is full. By the time pressure chamber 16 is full, pressure chamber 12 has already been pressurized, emptied, and depressurized. Therefore, filling of pressure chamber 12 can start again and this filling sequence continues until there is an interruption in the production.

Once the pressure chamber 12 is full with wet pulp fibers 18 it will be pressurized with compressed air from accumulator 20. Pressurizing does not take as much time as the filling, so emptying the pressure chamber 12 will start while pressure chamber 14 is still being filled. By the time pressure chamber 12 is empty, pressure chamber 14 has already been filled and pressurized, and is ready for emptying. Again, by the time pressure chamber 14 is empty, pressure chamber 16 has been filled and pressurized and is ready for emptying. This emptying sequence continues until there is an interruption in the production.

Once the pressure chamber 12 is empty it will be depressurized by using air compressor 26 to recover the pressure energy in chamber 12 back into the compressed air accumulator 20. Depressurizing does not take as much time as emptying a pressure chamber from wet pulp fibers 18, so at the end of de-pressurizing the air compressor's 26 air intake will be shifted to fresh atmospheric air by opening the fresh air intake valve 38 and closing the recycle valve 36. The fresh air intake valve 38 is kept open until pressure chamber 14 is ready for depressurizing. Again, by the time pressure chamber 16 is empty, it will be depressurized in the above manner. This depressurizing and fresh compressed air makeup sequence continues until there is an interruption in the production.

DESCRIPTION OF THE SECOND EMBODIMENT a. Main Components of the Apparatus

Figure 3:
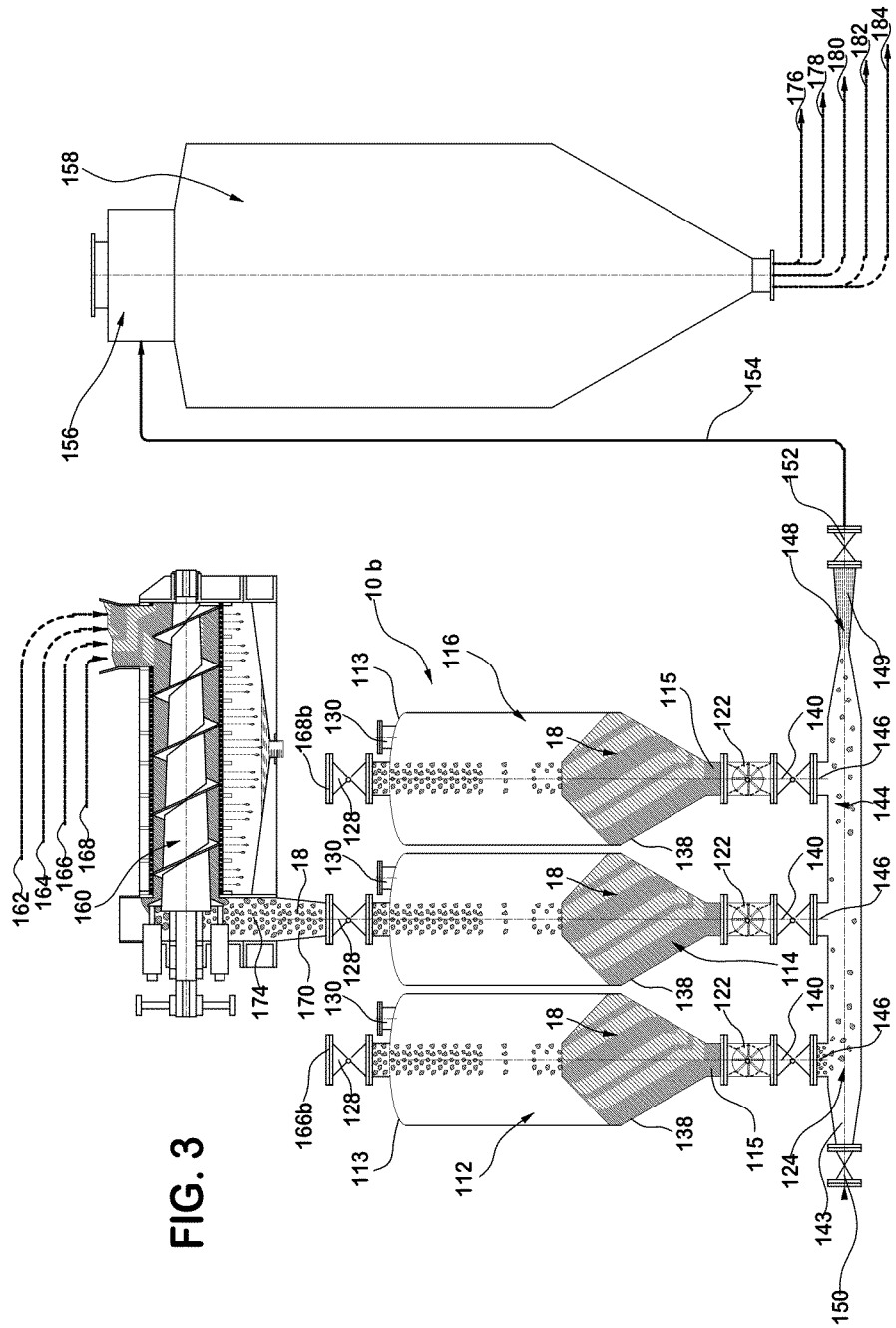
FIG. 3 is an assembly diagram of the apparatus of the second embodiment of the present invention showing reference numbers for general description of the apparatus.

With reference to FIG. 3, the apparatus of the second embodiment of the present invention comprises one or more feed chambers for the wet pulp fibers, one or more rotary valves to ration out the pulp fibers from the feed chambers while maintaining a good steam lock condition, a pressurized flow chamber pipe assembly to receive the fibers through the rotary valves, a steam valve to feed and pressurize the pressurized flow chamber pipe assembly, and a venturi tube section and blow valve to discharge the fiber-steam mixture from the pressurized flow chamber pipe assembly. FIG. 3 shows three feed chambers.

The feed chambers are operated on a continuous basis, and more than one feed chamber are used in cases where more than one pulp grade is processed simultaneously to provide a desired mix of fibers.

(b) General Description of the Apparatus

With reference to FIG. 3, the apparatus 10b of the present invention comprises three elongate atmospheric pressure feed chambers 112, 114 and 116 being fed with wet pulp fibers 18, which are rationed out with rotary valves 122 to the pressurized flow chamber 124. The rotary valves 122 maintain a good steam lock condition between the feed chambers and the pressurized flow chamber. All three feed chambers 112, 114 and 116 have an upper end 113 and lower end 115.

There are two nozzle connections at the upper end 113. Valve 128 controls the inlet stream of wet pulp fibers 18 into the feed chamber. Air bleed nozzle 130 ensures atmospheric pressure condition in the feed chambers at all times during the operation.

The lower end 115 comprises a conical section 138 to direct the wet pulp fibers 18 to the flow rationing rotary valve 122, and a discharge valve 140 to let the wet pulp fibers 18 into the pressurized flow chamber 124. The amount of steam flow transferred in the pockets of the rotary valve 122 on the return side from the pressurized flow chamber 124 to the feed chamber will be cooled by the wet pulp fibers 18 and condensed to water, or will escape through the upper end 113 air bleed nozzle 130.

The apparatus 10b can be considered as having two main operating sections that cooperate with one another to accomplish the major functions of the present invention. First, there are the above described three feed chambers 112, 114 and 116, and second, there is the pressurized flow chamber 124. The pressurized flow chamber 124 has two main sections; a pipe assembly 144 to receive the wet pulp fibers 18 alternatively through three nozzle locations 146 on the top of the pipe assembly 144 and; a venturi tube section 148. The inlet end 143 of the pipe assembly 144 is connected to a feed valve 150 for feeding and pressurizing the pressurized flow chamber 124 with gas or steam vapors. The discharge end 149 of the venturi tube section 148 is connected to a blow valve 152 to discharge the fiber-steam mixture from the pressurized flow chamber 124 through a blow line 154 into a cyclone 156 on top of a high density storage tank 158.

The apparatus 10b is supplied with wet pulp fibers typically at 25 to 30 percent consistency. FIG. 3 shows a typical thickening apparatus 160 in the form of a screw press. A pipeline 162 from a pulp storage tank or a pipeline 164 from a repulper feed the thickening apparatus 160 typically with 2 to 5 percent pulp slurry. A pipeline 166 from a decker or 168 from a pulp washer will supply the thickening apparatus 160 typically with pulp at 10 to 15 percent consistency. A chute assembly 170 directs the thickened wet pulp fibers 18 from the discharge end 174 of the thickening apparatus 160 into feed chamber 114. Feed chambers 112 and 116 have their own similar thickening apparatuses which are not shown in FIG. 3.

In some instances there may be advantages to use lower feed consistencies, such as 10 to 25 percent or higher consistencies, such as 30 to 45 percent. When 10 to 15 percent feed consistency is desired then the pipeline 166b from a decker and/or 168b from a pulp washer can be used to feed directly the feed chambers 112 and/or 116.

As was already described in connection with the first embodiment of the present invention, depending on what kind of pulp fibers are being processed with the apparatus of the present invention, the processed pulp in the high density storage tank 158 will be diluted and pumped out either through line 176 to a rewasher, line 178 to screen room, line 180 to bleach plant, line 182 to refiners, or line 184 to a paper machine.

All benefits of the fiber spitting operation as described in connection with the first embodiment of the present invention apply also to this second embodiment of the present invention.

(c) Brief Description of the Overall Operation of the Invention

With the foregoing detailed description of the apparatus in mind, there will now be a brief description of the overall operation of the present invention. The operation of this second embodiment of the present invention is continuous but the fiber splitting takes place in exactly the same manner as was already described in connection with the first embodiment.

The preferred range of the operating pressure in the pressurized flow chamber of the second embodiment is typically 5 to 10 bars. In some instances there may be advantages to use lower pressures, such as 1 to 5 bars. If operating pressures above 10 bars are desirable, then it is preferable to use the first embodiment of the present invention as described above. Its batch operation with the pressure chambers eliminates the high demand on the rotary valves to provide a good steam/air lock condition between the feed chambers of the second embodiment and the pressurized flow chamber.

Description of the Third Embodiment a. Main Components of the Apparatus

Figure 4:
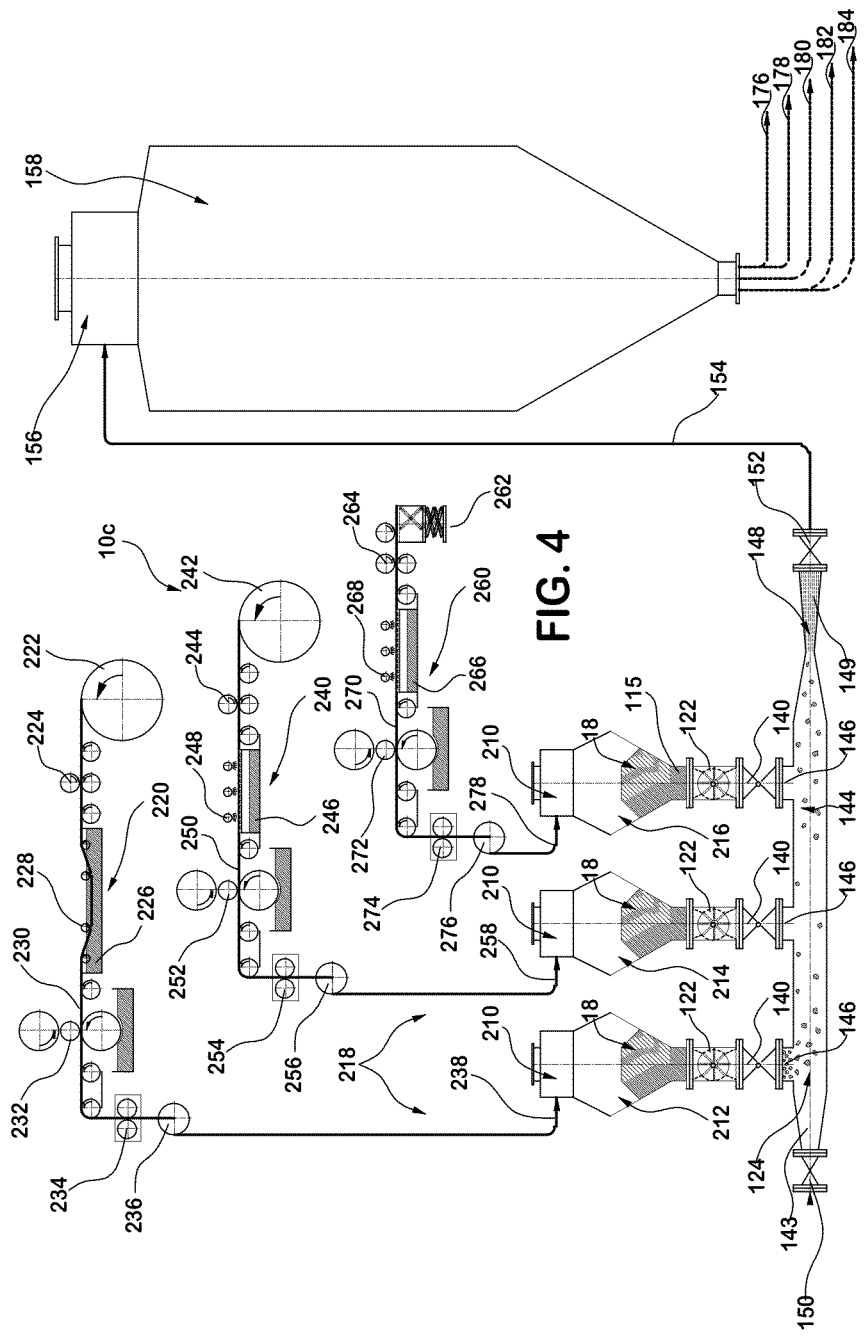
FIG. 4 is an assembly diagram of the apparatus of the third embodiment of the present invention showing reference numbers for general description of the apparatus.

With reference to FIG. 4, the apparatus of the third embodiment of the present invention is used for fibrous feedstock that is already dry, typically from 35 percent consistency to air dry at 90%, and typically in the form of rolls or bales of cut sheets. It comprises one or more moisturizing feed lines, one or more feed chambers for the wet pulp fibers, one or more rotary valves to ration out the pulp fibers from the feed chambers while maintaining a good steam lock condition, a pressurized flow chamber pipe assembly to receive the fibers through the rotary valves, a steam valve to feed and pressurize the pressurized flow chamber pipe assembly, and a venturi tube section and blow valve to discharge the fiber-steam mixture from the pressurized flow chamber pipe assembly. FIG. 4 shows three processing lines, two for processing dry pulp or paper webs in roll form and one line for processing cut and baled pulp or paper sheets.

The moisturizing liquid is typically water but other liquids can be used as well. In some applications it can be desirable to penetrate the fibers with liquid bleaching agents before the fiber splitting takes place. This ensures hundred percent mixing of chemicals with the fibers during the passage through the venturi throat. When chemicals are used in the moisturizing process, all or part of the moisturizing line will be enclosed and ventilated to contain volatile vapors.

Another application for using chemicals in the moisturizing line of the present invention is for production of sodium carboxyl methyl cellulose (CMC), hydroxyl ethyl cellulose (HEC), methyl ethyl cellulose (MEC) and cellulose diacetate.

The processing lines are operated on a continuous basis. Only the moisturizing feed lines will be described in more detail below since the rest of the apparatus and method of the third embodiment of the present invention is essentially same as in the second embodiment.

(b) General Description of the Apparatus

With reference to FIG. 4, the apparatus 10c of the third embodiment of the present invention comprises three atmospheric pressure feed chambers 212, 214 and 216 being fed with wet pulp fibers 18 from moisturizing lines 220, 240 and 260. The wet pulp fibers are rationed out with rotary valves 122 to the pressurized flow chamber 124. The rotary valves 122 maintain a good steam lock condition between the feed chambers and the pressurized flow chamber.

Since from this point on the third embodiment remains essentially the same as already described in connection with the second embodiment, its description will not be repeated. All three feed chambers 212, 214 and 216 have a cyclone 210 on the top for fiber separation from the air stream of the pneumatic conveyor system 218 that is the preferred way of delivering the wet fibers from the moisturizing lines to the feed chambers 212, 214 and 216.

The apparatus 10c is supplied with dry pulp or paper typically at air dry consistency of 90 percent.

Moisturizing line 220 comprises a roll feeder 222, plurality of rotating slitter blades 224, a liquid filled dip pan 226, in which immersion rolls 228 keep the moving fiber web 230 submersed in the moisturizing liquid, a cylinder press 232 for final moisturizing liquid penetration and end moisture control, a shredder 234, a blower 236, and a pneumatic conveying pipe 238 which transports the shredded wet fibers into cyclone 210 on top of the feed chamber 212.

Moisturizing line 240 comprises a roll feeder 242, plurality of rotating slitter blades 244, a moisturizing liquid collector pan 246, liquid spray nozzles 248 across the moving fiber web 250, a cylinder press 252 for final moisturizing liquid penetration and end moisture control, a shredder 254, a blower 256, and a pneumatic conveying pipe 258 which transports the shredded wet fibers into cyclone 210 on top of the feed chamber 214.

Moisturizing line 260 comprises a cut sheet feed table 262, plurality of rotating slitter blades 264, a moisturizing liquid collector pan 266, liquid spray nozzles 268 across the moving fiber sheets 270, a cylinder press 272 for final moisturizing liquid penetration and end moisture control, a shredder 274, a blower 276, and a pneumatic conveying pipe 278 which transports the shredded wet fibers into cyclone 210 on top of the feed chamber 216.

The overall operation of the third embodiment of the present invention is similar to the overall operation of the second embodiment and therefore its description will not be repeated.

As was described earlier in the section BACKGROUND OF THE INVENTION, Fiber Morphology, there are differences between softwoods and hardwoods. Softwoods are dominated by one fiber type, the tracheid, while hardwoods have fiber tracheids and vessel elements. However, the apparatus and method of the present invention works equally well to split both softwood and hardwood tracheids longitudinally.

(b) Method of Washing

All conventional pulp washing methods displace spent liquor with clean wash liquid only from the space outside and between the pulp fibers, but leave practically all spent liquor, containing the already dissolved organic matter and spent processing chemicals inside the fiber lumen. Only some leaching of the inside bound liquor happens during the dilution/extraction stages between multiple washing steps in series. A substantial amount of spent liquor, typically 1.5-2 times the weight of the pulp fibers is, after the washing, still carried over inside the hollow fiber lumen to the next processing stage. In case of unbleached pulp, all already dissolved organic matter and spent chemicals in the carry-over liquid end up later in the papermaking process as effluent into the waterways, instead of being recovered through evaporation and recovery boiler for fuel and chemical make-up, as happens to all organic matter and spent chemicals, when they are recovered with the washer discharge filtrate. A large portion of the carry-overs in bleach plant washing also contribute to the environmental pollution as effluent. Some pulp mills recycle wash liquids from downstream washers as wash liquids to be used as wash liquids in the upstream washers for chemical recovery in case of oxygen and peroxide bleaching. However, worldwide the majority of bleaching is done with chlorine dioxide and all filtrates from those washers end up as effluent.

Figure 5:
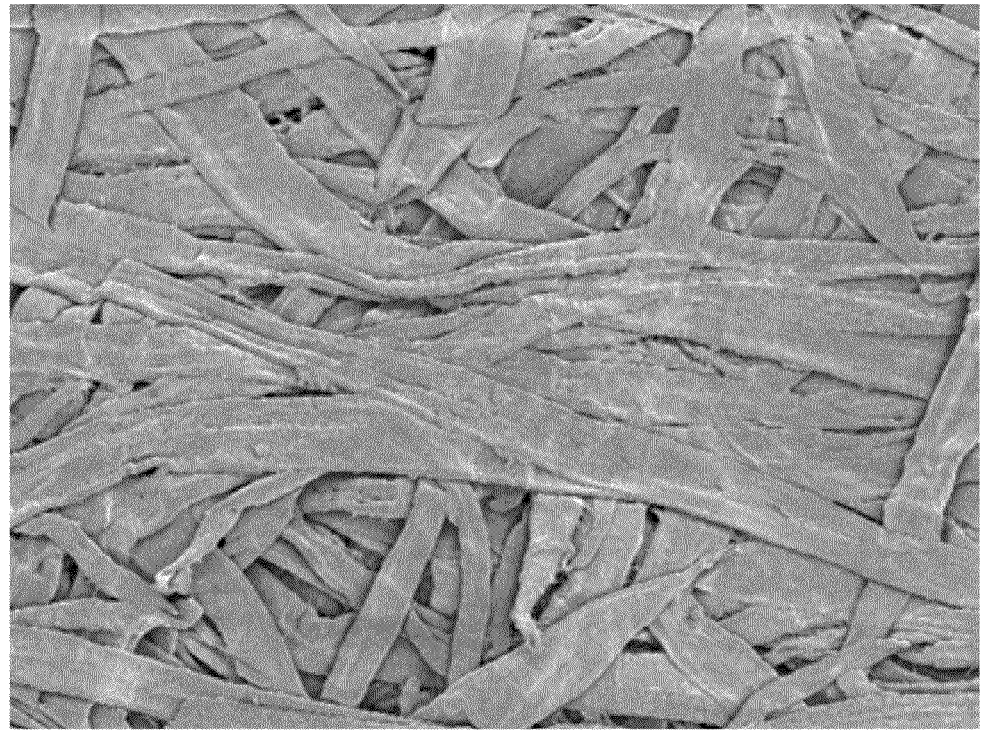
FIG. 5 is a SEM photograph of bleached softwood pulp fibers at magnification 200.
Figure 6:
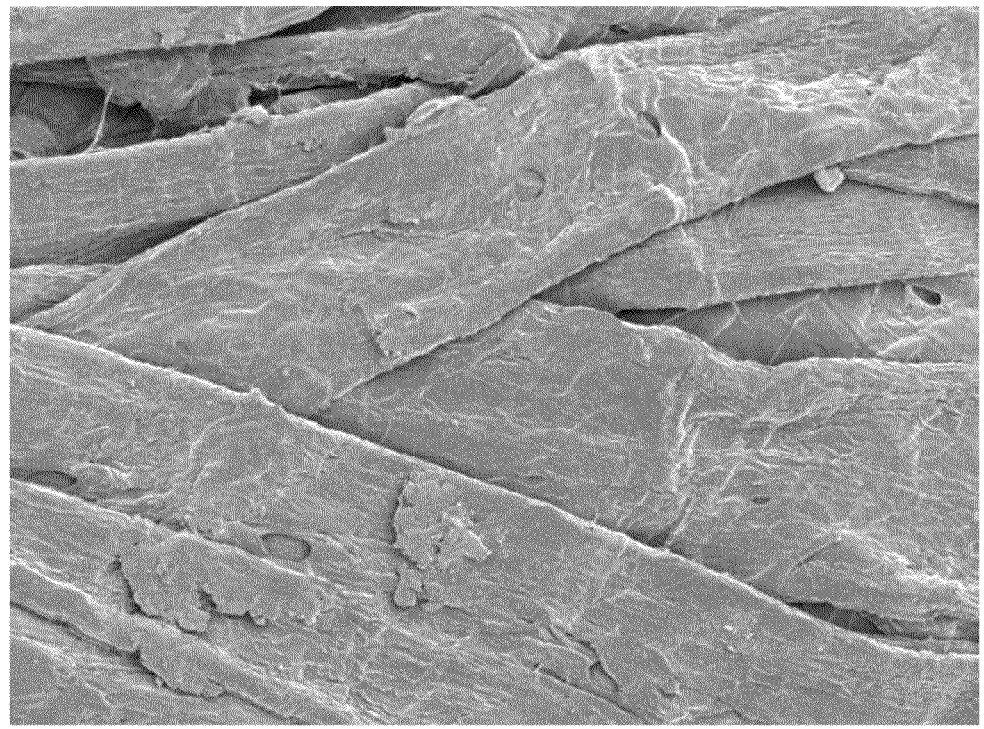
FIG. 6 shows the center of the same SEM photograph of FIG. 5 at magnification 1000.

FIG. 5 is a SEM photograph of bleached softwood pulp fibers at magnification 200 and FIG. 6 shows the center of the same SEM photograph at magnification 1000. As can be seen in FIG. 6, the bordered pit holes 310 are clearly visible as tiny round circles e.g. in the top two fibers running in the direction from 10 o'clock to 4 o'clock and from 8 o'clock to 2 o'clock.

Attention is here drawn to the fact that the cross sectional area of the bordered pit holes 310 represents such a miniscule percentage of the total surface area of the pulp fibers, that it is hard to imagine any transfer of wash liquid through these holes into the fiber lumen to displace any dissolved organic matter and processing chemicals inside the lumen during the washing stage, and then at the same time transfer them out through these same passage ways.

Figure 7:
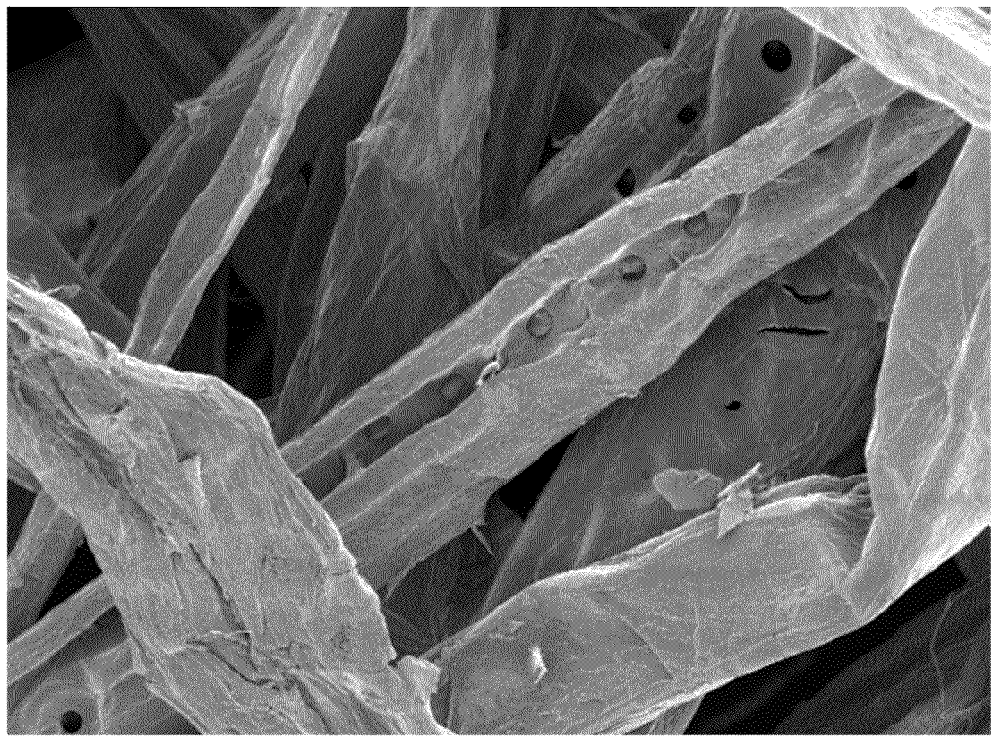
FIG. 7 is a SEM photograph of unbleached softwood pulp fibers at magnification 600 processed with a pilot scale laboratory apparatus of the present invention.
Figure 8:
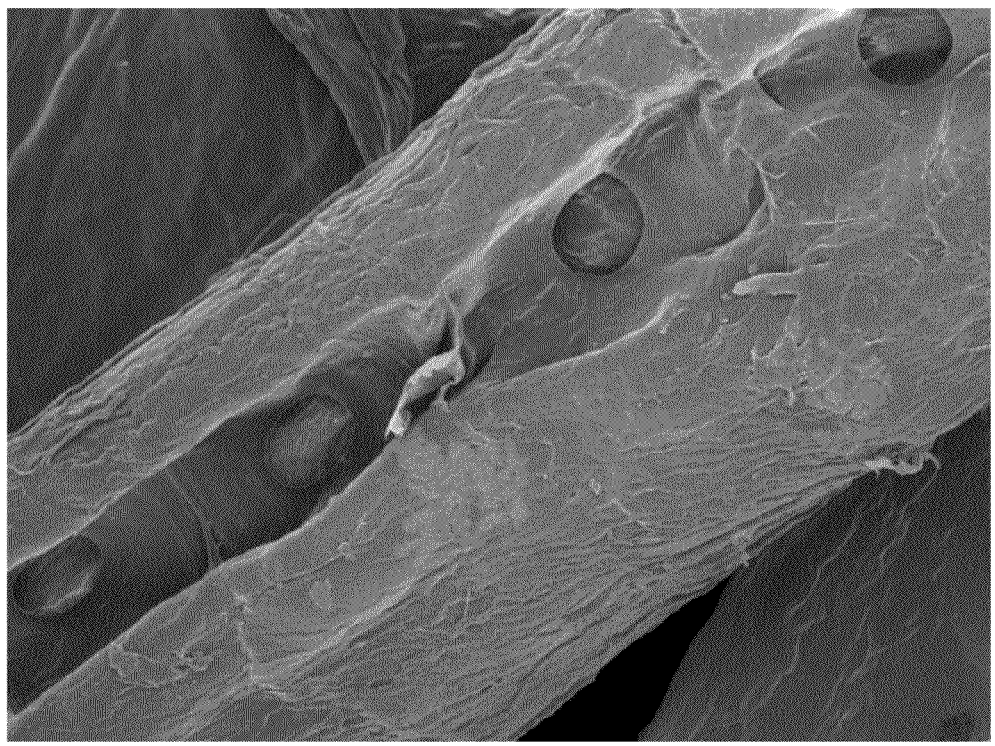
FIG. 8 shows the center of the same SEM photograph of FIG. 7 at magnification 2000.

FIG. 7 is a SEM photograph of unbleached softwood pulp fibers at magnification 600. The fibers were processed with a pilot scale laboratory apparatus of the present invention using 8 bar pressure steam vapors as the process gas. FIG. 8 shows the center of the same SEM photograph at magnification 2000. As can be seen in FIG. 7, and in more detail in FIG. 8 the fibers have been split longitudinally and the bordered pit holes 310 are clearly visible from the inside of the fiber lumen.

Figure 9:
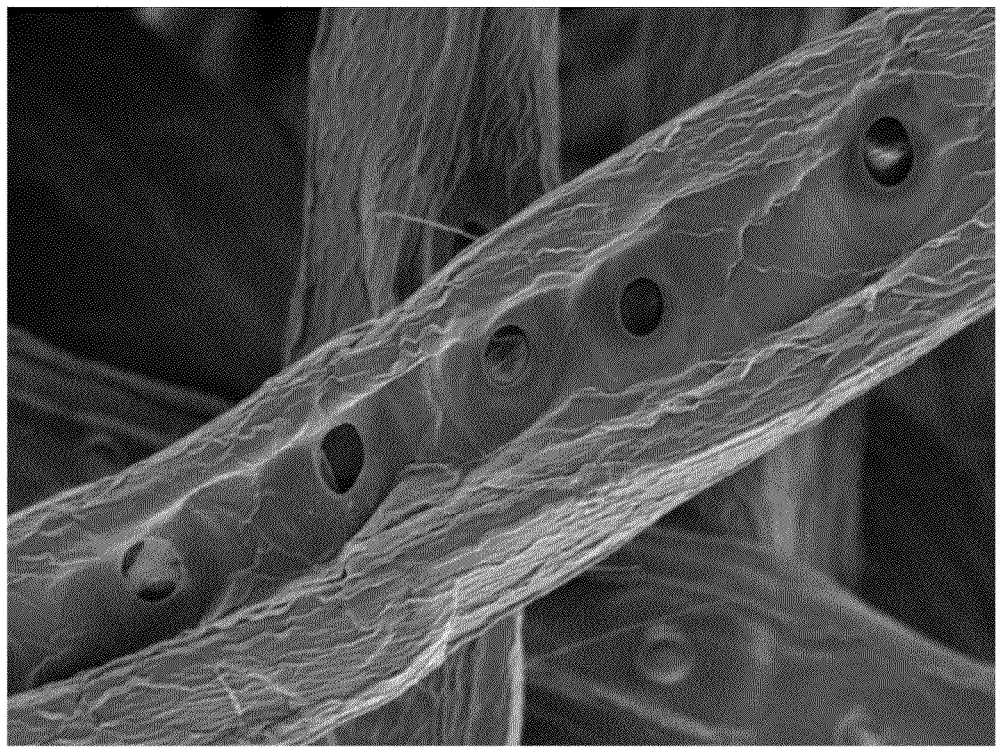
FIG. 9 shows longitudinally split unbleached softwood pulp fibers at magnification 1300.
Figure 10:
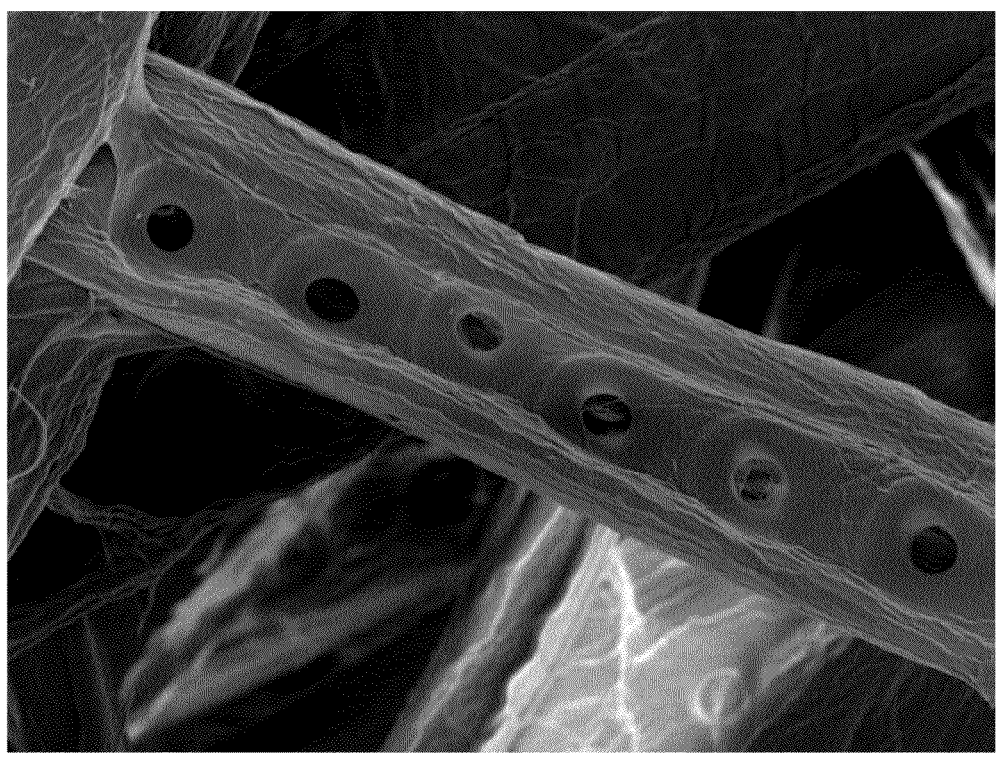
FIG. 10 shows longitudinally split unbleached softwood pulp fibers at magnification 1300.

The same processing method with a pilot scale laboratory apparatus of the present invention was used again with 8 bar pressure compressed air as the process gas. FIG. 9 is a SEM photograph of such unbleached softwood pulp fibers at magnification 1300 and FIG. 10 another at magnification 1100. As can be seen in both of these SEM photographs the bordered pit holes 310 are predominantly lined up in a singly row parallel to the fiber cell longitudinal axis, and the longitudinal split has happened along the fiber cell wall opposite to the line of the bordered pit holes.

Figure 11:
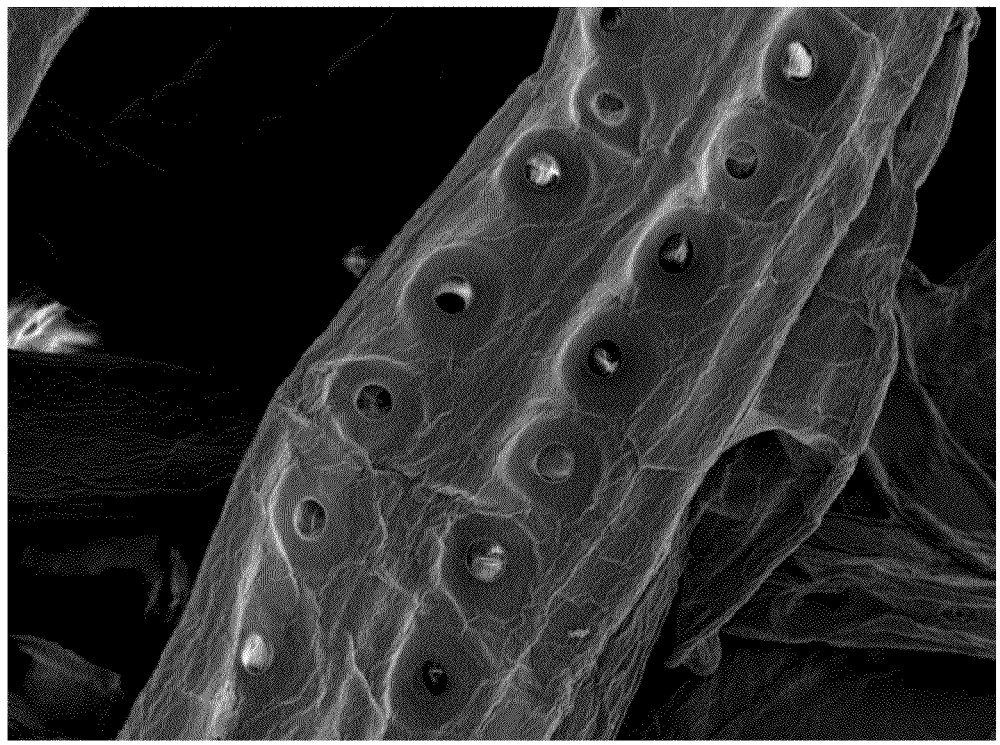
FIG. 11 shows two parallel lines of bordered pit holes in the same fiber cell at magnification 700.
Figure 12:
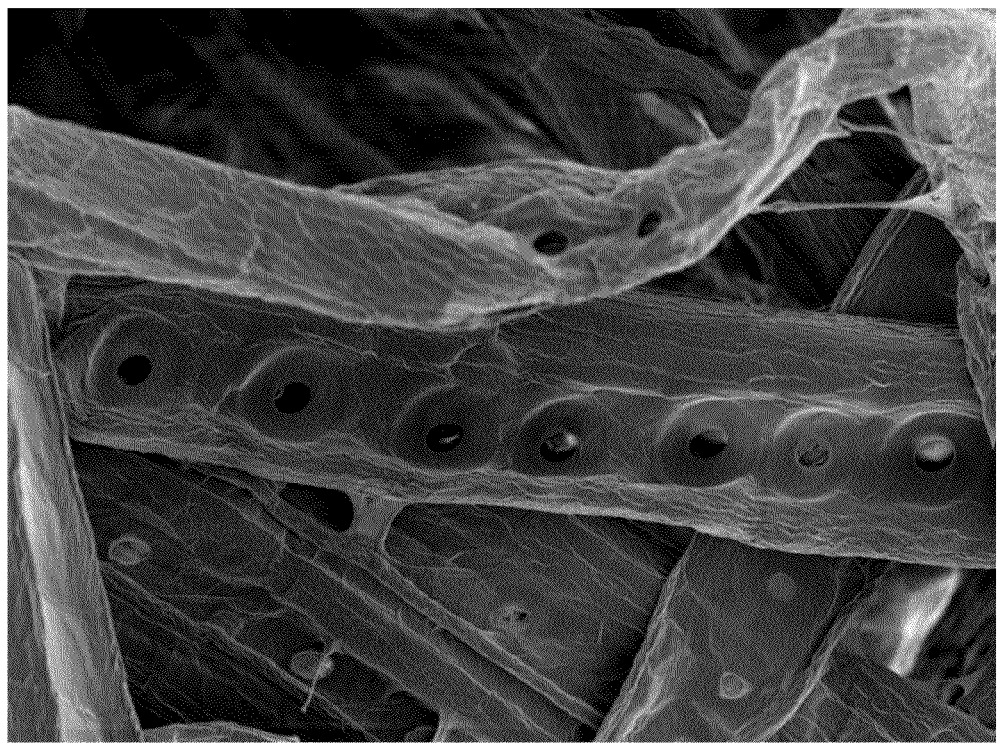
FIG. 12 shows micro-fibril bridges between split fiber cells at magnification 700.

An interesting exception is shown in FIG. 11 at magnification 700, where there are two parallel lines of bordered pit holes in the same fiber cell. FIG. 12, at magnification 700, shows valuable, paper strengthening micro-fibril bridges between individual fiber cells, such as the narrow ones in the upper right hand corner, and a wide bridge connection slightly left and below the center of the photograph.

By examining FIG. 7-12 one can draw the conclusion that all the bound liquor inside the fiber lumen has become free and washable due to the longitudinal fiber split accomplished with the apparatus and method of the present invention.

SUMMARY OF METHOD OF WASHING

A method to remove dissolved organic matter and chemicals from the interior of hollow fibrous cells consists of means to subject the wet fibers first to a sudden pressure drop by feeding the fibers into an above atmospheric pressure flow chamber, where pressure is maintained with gas or steam vapors at high enough pressure to force the mixture of wet fibers and gas or steam vapors to flow through a substantially reduced cross-sectional area, such as through a venturi throat, in said flow chamber into another chamber at substantially lower pressure, preferably atmospheric, causing said sudden pressure drop between the liquor filled interior of the fibers and the gas or steam vapor surrounding the fibers, to split the fiber cell wall along a longitudinal line, and then use other means, such as conventional washers, to rewash the split fibers to displace the dissolved organic matter and chemicals from the pulp mat with clean liquid (c) Method of Bleaching Again, reference is made to FIG. 5 and FIG. 6.

Bleaching chemicals can reach the residual lignin in the fiber cell only through the outside surface of the cell wall leaving the inside surface of the lumen unbleached.

As can be seen in FIG. 6, the cross sectional area of the bordered pit holes represents such a miniscule percentage of the total surface area of the pulp fiber, that it is hard to imagine any transfer of bleaching chemicals through these holes into the fiber lumen and then at the same time any dissolved organic matter to diffuse out through these same passage ways.

Again, with reference to FIG. 7-12, one can draw the conclusion that the longitudinally split fibers will allow the bleaching chemicals to reach the residual lignin in the fiber cells from both sides of the cell wall reducing bleaching time to half. It follows, that required bleaching chemical charge, chemical consumption, process temperature, and pressure will also drop. Bleach plant capacity will increase substantially, and in some cases, the amount of bleaching stages can be reduced.

Since all bleaching stages also include a washing process, where the dissolved organic matter and the spent bleaching chemicals are removed, it follows that with split fibers the carry-over to the next processing stage will be nil.

The following laboratory test results are in support of the earlier statement that "bleaching chemicals can reach the residual lignin in the fiber cell only through the outside surface of the cell wall leaving the inside surface of the lumen unbleached". Bleached softwood fibers were first processed with a pilot scale laboratory apparatus of the present invention. Then the brightness (ISO %) of both the reference pulp without fiber splitting and the split-fiber-pulp was measured after subjecting them to different levels of refining at 0, 50, 100, 150 and 200 kWh/t.

The brightness % reduction in the reference pulp is only modest (1.9 units at 200 kWh/t) from 89.4 at 0 refining to 88.5, 88.0, 87.7 and 87.5 at 50, 100, 150 and 200 kWh/t of refining energy respectively. The mechanical refining action separates fibrils and fines away mainly from the bleached outside surface of the reference pulp fibers as well as breaks some of the fibers across their cross section, but leaves most of the fiber interiors unexposed.

The brightness % reduction in split-fiber-pulp is markedly larger (6.2 units at 200 kWh/t) from 83.9 at 0 refining to 81.5, 80.1, 78.8 and 77.7 at 50, 100, 150 and 200 kWh/t of refining energy respectively.

In the split-fiber-pulp samples the fibers are split longitudinally and the unbleached interior surfaces of the lumen are exposed (see FIG. 7-12). Even without any mechanical refining (0 kWh/t) the brightness of the split-fiber-pulp has already dropped (5.5 units) to 83.9% from 89.4% in reference pulp. When this 5.5 units brightness % drop, due to plain fiber splitting, is added to the additional drop of 6.2 units, due to 200 kWh/t refining energy, the total brightness drop is 11.7 units compared to 1.9 units in the reference pulp.

Fiber splitting and additional refining of course expose more and more of the unbleached interior fiber wall surfaces dropping the brightness accordingly. This pronounced drop in brightness supports the recommendation that the best position for the use of the apparatus and method of the present invention is in the unbleached pulp washing line. Not only will the split fibers release all the bound liquor in the fiber lumen, allowing recovery of practically all cooking chemicals, but also all carry-over to and between the following bleaching stages will be reduced to practically nil, allowing more economical and environmentally friendlier operation of pulp and paper mills.

Summary of Method of Bleaching

A method to bleach hollow fibrous cells consists of means to subject the wet fibers first to a sudden pressure drop by feeding the fibers and bleaching chemicals into an above atmospheric pressure flow chamber, where pressure is maintained with gas or steam vapors at high enough pressure to force the mixture of wet fibers, bleaching chemicals, and gas or steam vapors to flow through a substantially reduced cross-sectional area, such as through a venturi throat, in said flow chamber into a bleaching chamber at substantially lower pressure, either atmospheric or pressurized, causing said sudden pressure drop between the liquor filled interior of the fibers and the gas or steam vapor surrounding the fibers, to split the fiber cell wall along a longitudinal line exposing the interior surface of the fibers to direct contact with the bleaching chemicals, and then allowing time for the bleaching chemicals to react with the organic matter, such as lignin, in the fibers under controlled temperature and pressure conditions, until the desired bleaching target has been reached. Thereafter the bleached fibers are discharged from the bleaching chamber and washed by conventional means and delivered to the next processing step. Conventional means are provided to maintain the proper bleaching temperature and pressure in the bleaching chamber, e.g. with steam or liquor circulation.

(d) Method of Chemical Treatment

Some end products in chemical pulping require additional chemical treatment after the conventional bleaching stages. This method of chemical treatment is similar to the above method of bleaching in the way that the apparatus is practically the same but the feedstock fibers have already been bleached to a desired extent before the chemical treatment begins.

Again, reference is made to FIG. 5 and FIG. 6.

Chemical treatment chemicals can reach the residual lignin and hemicelluloses in the bleached fiber cell only through the outside surface of the cell wall when the bleached fiber cells have been processed with conventional pulping technologies. As can be seen in FIG. 6, the cross sectional area of the bordered pit holes represents such a miniscule percentage of the total surface area of the pulp fiber that it is hard to imagine any transfer of treatment chemicals through these holes into the fiber lumen to react with the lignin and hemicelluloses also from inside out.

Again, with reference to FIG. 7-12, one can draw the conclusion that the longitudinally split fibers will allow the treatment chemicals to reach the residual lignin and hemicelluloses in the fiber cells from both sides of the cell wall reducing reaction time to half. It follows, that required treatment chemical charge, chemical consumption, process temperature, and pressure will also drop. Treatment plant capacity will increase substantially, and in some cases, the amount of treatment stages can be reduced.

There is a practical reason why the high purity dissolving pulps have a final cellulose content of 96% in the sulfite process and 98% in the Kraft process, even after several special alkaline purification treatments. Trying to get the last 2% of the hemicelluloses out would drop the final cellulose yield substantially. However, the longitudinally split fibers would allow the remaining 2% of the residual hemicelluloses to be extracted, most likely even at a higher final cellulose yield than in present processes.

Summary of Method of Chemical Treatment

A method to chemically treat bleached hollow fibrous cells consists of means to subject the bleached wet fibers first to a sudden pressure drop by feeding the bleached fibers and treatment chemicals into an above atmospheric pressure flow chamber, where pressure is maintained with gas or steam vapors at high enough pressure to force the mixture of bleached fibers, treatment chemicals, and gas or steam vapors to flow through a substantially reduced cross-sectional area, such as through a venturi throat, in said flow chamber into a reaction chamber at substantially lower pressure, either atmospheric or pressurized, causing said sudden pressure drop between the liquor filled interior of the bleached fibers and the gas or steam vapor surrounding the bleached fibers, to split the fiber cell wall along a longitudinal line exposing the interior surface of the fibers to direct contact with the treatment chemicals, and then allowing time for the treatment chemicals to react with the residual lignin and hemicelluloses in the bleached fibers under controlled temperature and pressure conditions, until the desired chemical treatment target has been reached. Thereafter, the treated end product is discharged from the reaction chamber by conventional means and delivered to the next processing step. Conventional means are provided to maintain the proper temperature and pressure in the reaction chamber.

(e) Method of Refining

As described earlier refining or beating of chemical pulps is the mechanical treatment and modification of fibers so that they can be formed into paper or board of the desired properties. It is one of the most important operations when preparing papermaking fibers for high-quality papers or paperboards. The main target of refining is to improve the bonding ability of fibers so that they form a strong and smooth paper sheet with good printing properties. Since the final bonding of fibers is a result of drying to form a paper sheet its impact on the paper properties will be described in detail in the next section (f) Method of Drying rather than here.

TABLE 2 shows a laboratory report on testing of conventional ECF bleached softwood (pine: *Pinus sylvestris*) pulp fibers: reference pulp. (ECF stands for elemental chlorine free.)

TABLE 3 shows a laboratory report on testing of the same ECF bleached softwood (pine: *Pinus sylvestris*) pulp fibers after they were first processed with a pilot scale laboratory apparatus of the present invention to split the fibers longitudinally: modified pulp.

Both reference and modified pulp samples were refined using 50, 125 and 200 kWh/t refining energy and the interpolated test results are shown in table format in TABLE 2 and TABLE 3. There are several clear indicators of substantial morphological changes in the modified split-fiber-pulp.

The fiber splitting is a refining action evidenced by the change in the freeness values. At 0 kWh/t of refining the reference pulp freeness in Schopper-Riegler scale is 14 while the modified pulp SR value is 14.5. Mild refining at 50 kWh/t increases the SR value of both pulps by 3, to 17 in reference pulp and to 17.5 in modified pulp. Thereafter, refining at 125 kWh/t energy level, the reference pulp SR has increased 3.5 to 20.5 but the modified pulp SR has increased 6.5 to 24. Further refining at 200 kWh/t level increases the reference pulp SR by an additional 7 to 27.7 and the modified pulp SR climbs an additional 12.5 to 36.5.

It is a well-known factor in the pulping industry that fibers with the same coarseness, but different diameters, will have different collapsing tendencies in refining. Of course the coarseness is the same in both the reference and modified pulp, being of the same wood specie. The principal value to the tendency for a fiber to collapse in refining comes from the relationship of fiber diameter and wall thickness. Both the reference and modified pulp have the same cell wall thickness but the modified pulp fiber periphery is almost double the periphery of the reference pulp, due to the longitudinal split, and represents therefore a double size "diameter".

TABLE 2 and TABLE 3 support this finding as well. With the reference pulp, 78 kWh/t of refining energy produced 600 ml CSF while the modified pulp required only 50 kWh/t of refining energy for the same freeness. Further, to reach 500 ml CSF the reference pulp required 150 kWh/t of refining energy while the modified pulp reached that target with 108 kWh/t of refining energy. That means that the reference pulp consumed 56% and 39% more refining energy than the modified pulp to reach 600 and 500 ml CSF respectively.

Reference is now made to the prior art explosion pulping, which also performs a kind of refining action, called defibrillation. The process was described earlier under Pulping in the section BACKGROUND OF THE INVENTION. Explosion pulping is an ultra-high-yield pulping process based on short time vapor-phase cooking at temperatures in the range of 180 to 210 DC, followed by explosive decompression. This process is very effective as a means of fiber separation with low energy consumption, but the resulting fibers are mostly uncollapsed, rigid, and unsuitable for papermaking. None of the fibers are split open.

Summary of Method of Refining

A method to refine hollow fibrous cells consists of means to subject the wet fibers first to a sudden pressure drop by feeding the fibers into an above atmospheric pressure flow chamber, where pressure is maintained with gas or steam vapors at high enough pressure to force the mixture of fibers and gas or steam vapors to flow through a substantially reduced cross-sectional area, such as through a venturi throat, in said flow chamber into a chamber at substantially lower pressure, preferably atmospheric, causing said sudden pressure drop between the liquor filled interior of the fibers and the gas or steam vapor surrounding the fibers, to split the fiber cell wall along a longitudinal line, and then use other means, such as conventional refiners, to further refine the fibers to the final desired freeness.

(f) Method of Drying Pulp, Paper and Paperboard

Multi-Cylinder Drying

No other test values in TABLE 2 and TABLE 3 will be analyzed in this connection since laboratory paper sheets do not represent well paper that is dried over steam heated cylinders. Lab sheets are dried without restrictions to the shrinkage. The fibers are most of the time in random directions giving false readings if compared to paper formed with a Fourdrinier section and dried over dryer cylinders. That's why TABLE 2 and TABLE 3 do not show separately any machine direction (MD) or cross direction (CD) values. As an example, typically paper MD tensile is 2.5 times CD tensile. As another example, one cannot compare a lab sheet's tear, with fibers in random directions, to tear of a real paper machine paper, where most of the fibers are oriented in the MD and substantially less in the CD.

However, TABLE 4 brings extra light to the superior characteristics of the split fiber pulp. TABLE 4 shows a laboratory report on testing of conventional unbleached softwood pulp fibers. The reference pulp was not processed with a pilot scale laboratory apparatus of the present invention, but the modified pulp was processed to split the fibers longitudinally. Both the reference and modified (split-fiber) pulp were refined at 100 kWh/t energy and then dried to paper with a laboratory cylinder dryer paper machine using a Fourdrinier wire section for the sheet formation.

Figure 13:
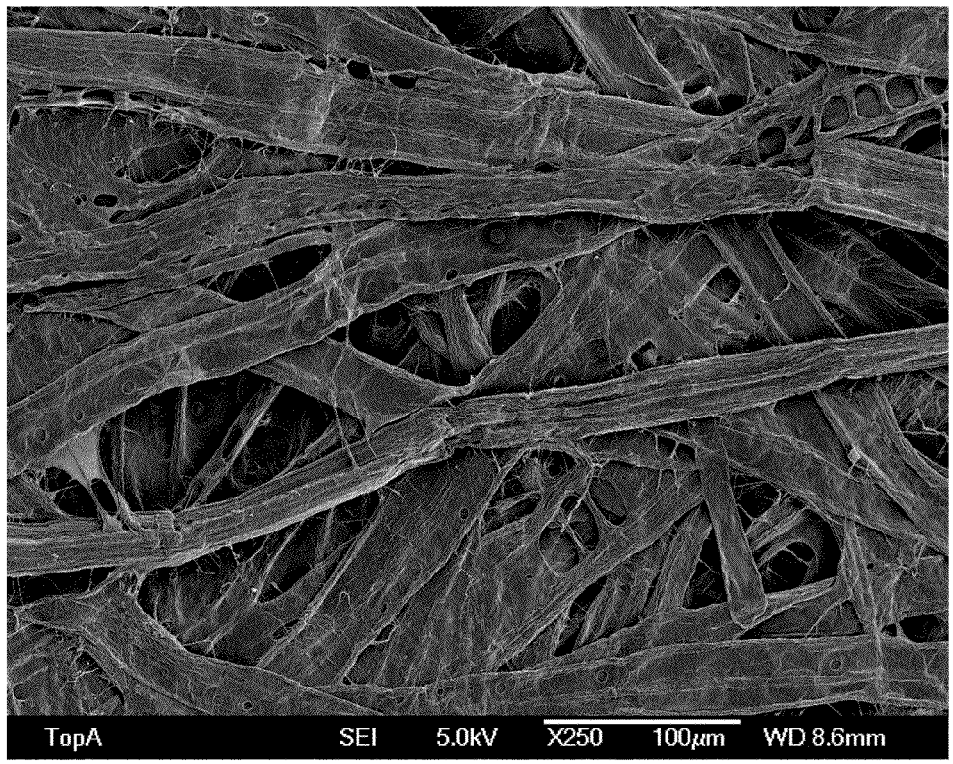
FIG. 13 shows the fiber structure of dried reference pulp paper of unbleached softwood pulp at magnification 250.
Figure 14:
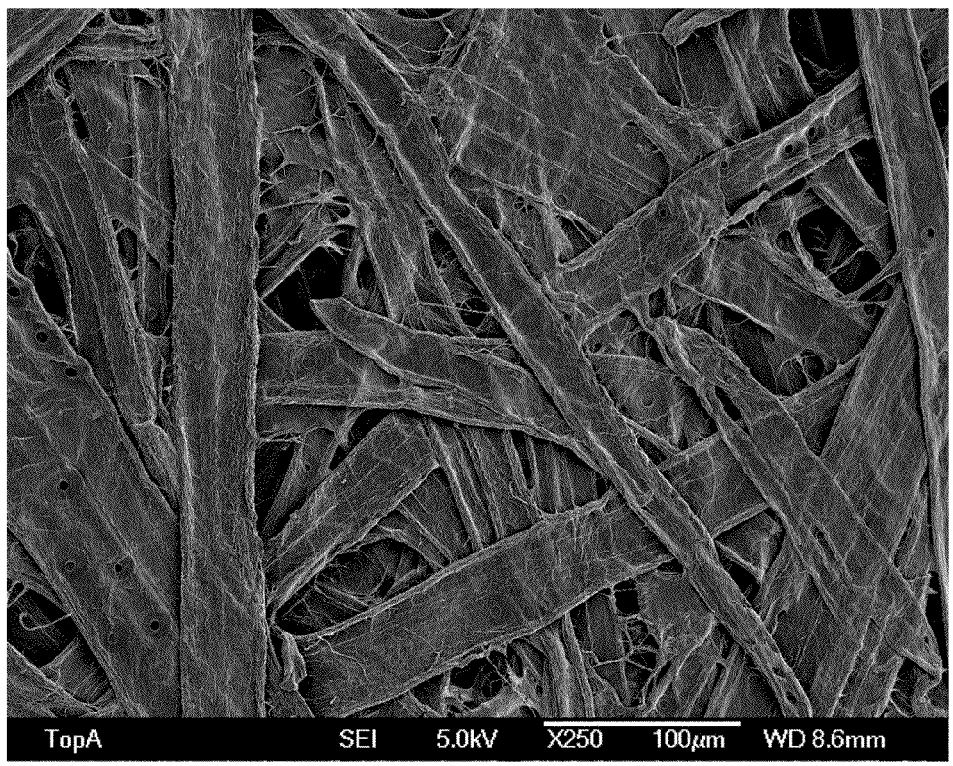
FIG. 14 shows the fiber structure of dried reference pulp paper of unbleached softwood pulp at magnification 250.
Figure 16:
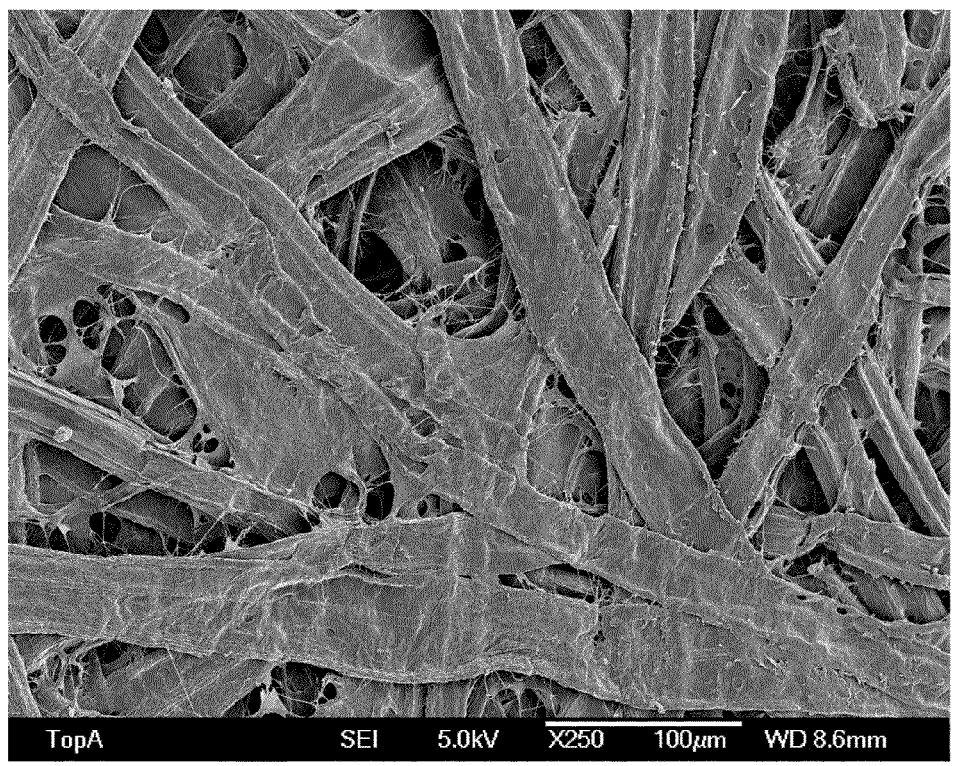
FIG. 16 shows the fiber structure of dried modified split-fiber-pulp paper of unbleached softwood pulp at magnification 250.

Two SEM photos, FIG. 13 and FIG. 14, at magnification 250, show the fiber structure of the reference pulp paper and two SEM photos, FIG. 15 and FIG. 16, also at magnification 250, show the fiber structure of the modified pulp paper. The differences in the fiber morphology between the reference and modified pulp papers are obvious and support well the findings in the test results as described earlier in section (e) Method of Refining regarding the ECF bleached softwood (pine: *Pinus sylvestris*) pulp fibers.

The modified pulp is more refined and has substantially more nano-scale fibrils reaching out and bonding with other fibers. The micro-fibril connections are not just between the fibers at the same level in the paper, but they reach even deeper into the paper, bonding with fibers several layers below. That leaves the reference pulp paper clearly more permeable than the modified pulp paper.

Once again reference is made to FIG. 12, at magnification 700, which shows valuable, paper strengthening micro-fibril bridges between individual fiber cells even without refining, such as the narrow ones in the upper right hand corner, and a wide bridge connection slightly left and below the center of the photograph. The molecules of the hemicelluloses are primarily responsible for the bonding of fibers together. The bonding takes place during the drying phase, when heat is transferred into the paper during its passage over the steam-heated dryer cylinders.

By comparing the test results in TABLE 4 one can see that the following paper characteristics are superior in the modified pulp paper:

i. tensile (over 10%) and stretch (over 20% in cross machine direction (CD))
ii. tensile energy absorption (17% in machine direction (MO) and 43% in CD)
iii. TEA index (19% in MD and 45% in CD)
iv. tensile stiffness and index (12-13% in CD)
v. modulus of elasticity (14% in MD and 24% in CD)
vi. burst strength and index (9-10%).

The most improved characteristic in the modified pulp paper is the internal bonding strength increase by 71% in MD and 66% in CD. This becomes obvious when examining FIG. 15 and FIG. 16. The increased internal bonding strength also improves substantially the bonding between the unbleached bottom and bleached top layer of liner board even when the top layer is not formed with the modified pulp. The fibrils on the top surface of the unbleached modified pulp bottom layer will reach several fiber layers deep into the bottom of the bleached top layer bonding the layers together during drying. Other values in TABLE 4 are about the same in both the reference and modified pulp paper within the accuracy of the test equipment.

Flash Drying

As was described earlier in BACKGROUND OF THE INVENTION under section Pulp processing, in flash drying the entrapped water in the fiber lumen immediately turns to steam (one cc of water becoming 1700 cc of steam) creating an uncontrolled internal explosion due to the 1700-fold expansion of vapors in the interior of the fiber lumen.

This does not happen in the apparatus and method of the present invention. The gas in the above atmospheric pressure flow chamber is not heated and the steam is saturated. The short time the wet unheated pulp fibers are exposed to the gas or steam vapors in the above atmospheric pressure flow chamber, typically less than one second, will not cause any measurable increase in the temperature of the liquid inside the fiber lumen. In the apparatus and method of the present invention the fiber lumen is full of non-compressible liquid, which will immediately lose its pressure, when the fiber cell wall splits open, and the freed liquid remains liquid. No flashing of the liquid takes place.

However, the receiving cyclone chamber after the discharge venturi of the present invention can be on top of a spray dryer system. Drying of the longitudinally split fibers will be very efficient due to the doubling of the contact surface area in the fibers with the hot drying gas, and due to the bound liquor inside the fiber lumen being freed to receive the evaporative heat input from the drying gas directly onto the liquor droplet's exposed outside surface, thus allowing heat transfer to bypass the fiber wall boundary layers.

Present Invention's Impact on Pulp, Paper and Paperboard Drying

The economics of transportation defines the manner in which pulp will be prepared for shipment. As described earlier in the Pulp processing section of the FIELD OF THE INVENTION, two basic systems are employed in the production of dry market pulp: the conventional system, and the flash-drying system.

The conventional system of producing dry market pulp parallels conventional papermaking: a thick pulp mat is formed with a Fourdrinier wet end, most remaining free water between the fibers is removed mechanically in the press section, and evaporative drying is employed with either a steam-heated cylinder dryer section or an air-float dryer section.

Flash or spray drying refers to the process whereby the fibrous material is introduced as a spray or an analogous form into a stream of hot gases. The high-temperature heat content of the gas stream causes the bound liquid inside the fiber lumen to flash violently to vapor causing substantial damage to the fiber cell wall.

These misshapen fibers have made flash-dried pulps recognized as being ideally suited to the needs of those mills producing filter papers and latex-saturated paper and board but not for high strength paper or board production.

However, drying of the longitudinally split fibers will not cause any flashing expansion inside the fiber lumen. Drying will be very efficient due to the doubling of the contact surface area in the fibers with the hot drying gas, and due to the bound liquor inside the fiber lumen being freed to receive the evaporative heat input from the drying gas directly onto the liquor droplet's exposed outside surface, thus allowing heat transfer to bypass the fiber wall boundary layers. In drying a sheet of paper two basic physical processes are involved, heat transfer and mass transfer. Heat is transferred from some source such as steam to the wet sheet in order to provide the energy required to drive the moisture from the sheet. The moisture evaporates and is then transferred from the sheet to the surrounding atmosphere by the mass transfer process.

Multi-cylinder drying is the most common way in the paper and paperboard industry.

Figure 17:
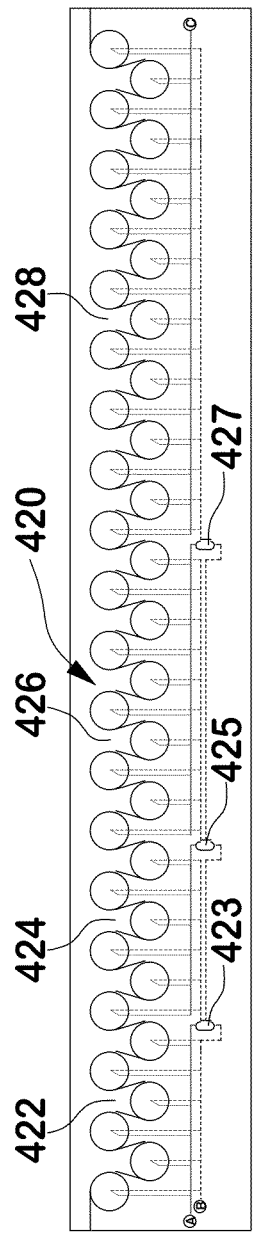
FIG. 17 shows a typical paper drying machine.

Reference is made to FIG. 17 which shows schematically a paper drying machine 420 typical in the prior art, which is divided typically to several sections of varying steam pressures. For example, first 6 cylinders are shown as the wet end section 422 and operated e.g. at 4 bar steam pressure. The last 17 cylinders are shown as the dry end section 428 and operated e.g. at 10 bar steam pressure. The condensate from the dryer cylinders of this end section 428 is flashed to steam at e.g. 8 bar pressure in the flash tank 427 and used to heat the previous 10 cylinders which form the dryer section 426. Again, the condensate from the dryer cylinders of this section 426 is flashed to steam at e.g. 6 bar pressure in the flash tank 425 and used to heat the previous 6 cylinders which form the dryer section 424. Finally the condensate from the dryer cylinders of this section 424 is flashed to steam at 4 bar pressure in the flash tank 423 and used to supply heat to the wet end dryer section 424.

The reason for this cascading use of higher steam pressure at the dry end and lower steam pressure at the wet end is the fact that it is easier to provide the heat transfer from the dryer surface to the paper web when there is still free water between the paper web fibers in direct contact with the typically cast iron surface of the dryer cylinders. Once the free water has been evaporated, it takes a higher temperature differential between the dryer cylinder surface and the paper surface to get the heat transferred through the fiber cell wall into the bound liquid inside the fiber lumen, and a higher temperature differential between the paper surface and the surrounding air to get the moisture mass transfer into balance with the heat input.

The further the paper dries, the more effective the already dried outer fiber layers in the paper become as an insulating layer to resist the heat transfer to the interior of the paper web. The dry outer fiber layers also slow down the moisture mass transfer out from the interior fiber cells that are still full of bound liquid. There are hundreds of layers of individual fibers to form the desired paper weight per square meter of paper surface.

Reference is made to FIG. 18, which shows schematically at the top the cross section of a sheet of paper 430a representing wet paper according to the prior art, where there is still plenty of free water left between the Individual fibers 431 in random directions and multiple layers. The middle sheet of paper 430*b* represents the cross section of paper where most of free water between the Individual fibers 432 has been removed by evaporation.

As can be seen from diagrams 430*a* and 430*b* there is free water all the time at the outside boundary layer of the paper sheets. The space between the individual fibers 431 and 432 allows free passage of the free water to fill the space left by evaporation as long as there is water to move freely. The bottom sheet of paper 430*c* represents the paper cross section where all free water has been removed and only the bound water remains inside the lumen of the fibers 433. As paper dries its logical that its thickness is being reduced accordingly.

Figure 19:
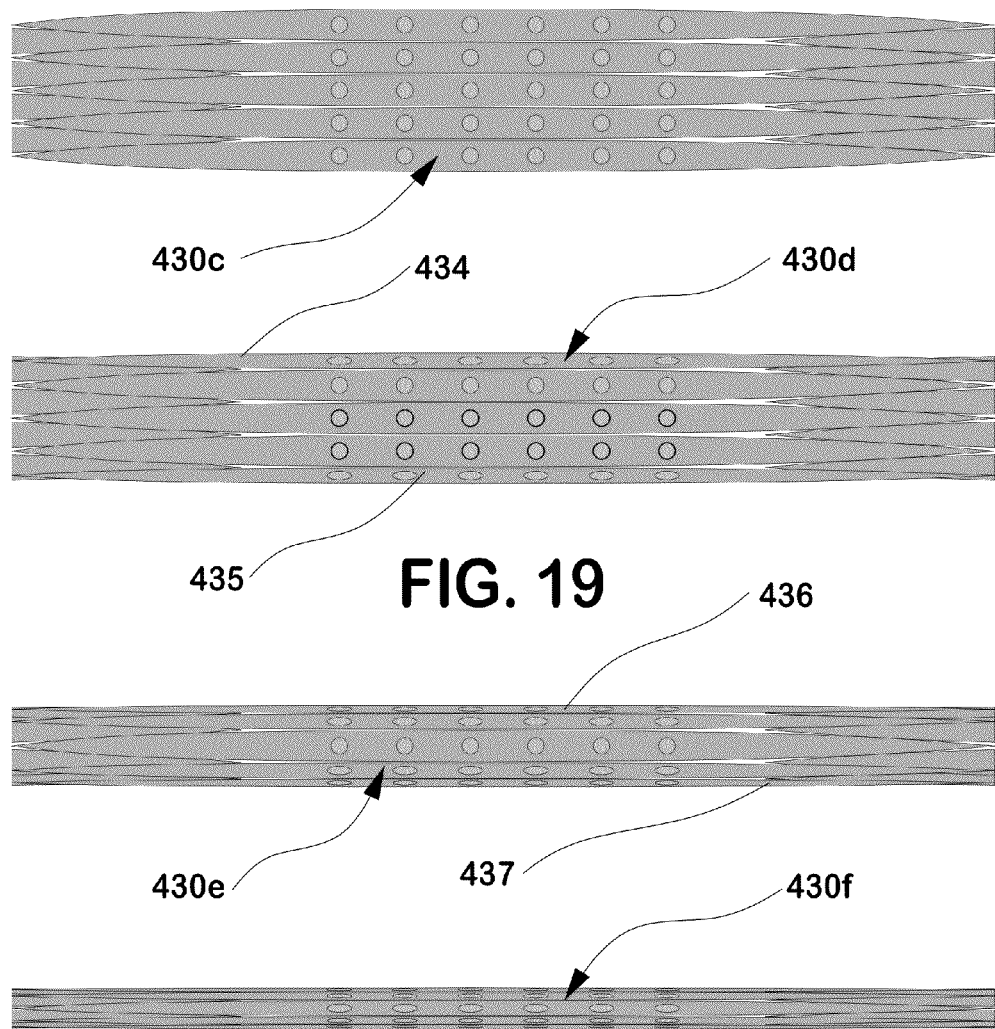
FIG. 19 shows the same cross-section after water removal.

Reference is now made to FIG. 19, which shows schematically at the top the same cross section of a sheet of paper 430*c* representing the paper cross section where all free water has been removed but all bound water still remains. Next cross section of a sheet of paper 430*d* represents paper where some of the bound water inside the top and bottom layers of the individual fibers 434 and 435 has started to dry and shrink the fibers in cross direction. Next sheet of paper 430*e* represents the cross section of paper where most of the free water between the individual fibers 436 and 437 has been removed by evaporation. The bottom sheet of paper 430*f* represents the paper cross section where almost all bound water has been removed and the sheet of paper is dry.

As the drying progresses from outside surfaces inward it becomes evident that the dried outer layers will start to slow down the heat transfer rate to the wet interior of the sheet. Each dried and collapsed fiber forms a double wall layer of insulation between the dryer and paper surfaces.

However, as can be seen in FIG. 20, where the bottom sheet of paper 430*g*, which represents the cross section of paper made with split fibers according to the present invention, is compared to the top sheet of paper 430*a* of FIG. 18, it is clear that all water in the paper sheet 430*g* is free to flow toward the outside surface in contact with the dryer cylinder until the paper sheet is dry. Therefore, there is no need to increase the steam pressure in the dryer cylinders toward the dry end. All cylinders can be heated with the lower steam pressure, e.g. 4 bars, which will dramatically reduce the paper machine energy consumption, increase its drying capacity, and reduce the amount of cylinders required for any particular capacity. Dryer cylinders can also be built with reduced wall thicknesses due to lower operating pressure rating.

It is also evident from the FIG. 20 that it takes almost double amount of individual split fiber layers to form a paper sheet of the same basis weight as paper formed with flat double-walled un-split fibers. This means also that the bonding surface areas between individual fibers will practically double thus increasing the paper bonding and other strength characteristics.

It is to be recognized that the above possible apparatuses, methods and modifications are given by way of example, and yet other possible apparatuses, methods and modifications could be made without departing from the basic teachings of the present invention.

TABLE 1

| | | | | | | Time → | | | | | | |
|---|---|---|---|---|---|---|---|---|---|---|---|---|
| Chamber 12 | Filling | Press. | | Emptying | | Depr. | Filling | Press. | | Emptying | | Depr. |
| Chamber 14 | | | Filling | | Press. | | Emptying | | Depr. | Filling | Press. | Emptying | Depr. |
| Chamber 16 | | | | | Filling | | Press. | | Emptying | | Depr. | Filling | Press. | Emptying | Depr. |
| Accumulator 20 pressurizing air source | | With fresh air | | | | From chamb. 12 | With fresh air | From chamb. 14 | With fresh air | From chamb. 16 | With fresh air | From chamb. 12 | With fresh air | From chamb. 14 | With fresh air | From chamb. 16 |

TABLE 2

| SEC kWh/t | SR rw. | CSF ml | WRV g/g | Tens. index Nm/g | Stretch % | TEA index J/g | T. stiff. index kNm/g | Elastic mod. GPa | Tear index mNm²/g | Burst index kPam²/g | Scott Bond J/m² | Zero-Span ind. wet Nm/g | Zero-Span ind. dry Nm/g | Frct.tgh index Jm/kg | Ap. tens. index Nm/g | Z-strength kPa |
|---|---|---|---|---|---|---|---|---|---|---|---|---|---|---|---|---|
| 0 | 14.0 | 685 | 1.53 | 41.2 | 4.9 | 1.51 | 4.22 | 2.64 | 21.8 | | | | | | | 541 |
| 50 | 17.0 | 635 | 1.73 | 68.3 | 4.2 | 1.99 | 6.11 | 4.26 | 16.4 | | | | | | | 750 |
| 125 | 20.5 | 540 | 1.87 | 87.2 | 4.2 | 2.44 | 7.25 | 5.35 | 12.9 | | | | | | | 910 |
| 202 | 27.5 | 415 | 2.02 | 96.7 | 4.3 | 2.75 | 7.82 | 6.10 | 11.3 | | | | | | | 1019 |
| | | | | | | INTERPOLATED | | | | | | | | | | |
| 57 | 17.3 | 626 | 1.74 | 70 | 4.2 | 2.0 | 6.2 | 4.35 | 16.1 | | | | | | | 764 |
| 148 | 22.6 | 503 | 1.91 | 90 | 4.2 | 2.5 | 7.4 | 5.57 | 12.4 | | | | | | | 942 |
| 78 | 18.3 | 600 | 1.78 | 75.3 | 4.2 | 2.2 | 6.4 | 4.66 | 15.1 | | | | | | | 809 |
| 150 | 22.7 | 500 | 1.92 | 90.2 | 4.2 | 2.5 | 7.4 | 5.59 | 12.4 | | | | | | | 945 |
| 114 | 20 | 554 | 1.85 | 84.5 | 4.2 | 2.4 | 7.1 | 5.20 | 13.4 | | | | | | | 887 |
| 175 | 25 | 460 | 1.97 | 93.3 | 4.3 | 2.6 | 7.6 | 5.83 | 11.9 | | | | | | | 980 |
| 100 | 19.3 | 572 | 1.82 | 80.9 | 4.2 | 2.3 | 6.9 | 4.99 | 14.1 | | | | | | | 857 |
| 150 | 22.8 | 499 | 1.92 | 90.3 | 4.2 | 2.5 | 7.4 | 5.60 | 12.4 | | | | | | | 945 |
| 200 | 27.3 | 418 | 2.02 | 96.5 | 4.3 | 2.7 | 7.8 | 6.08 | 11.3 | | | | | | | 1016 |

TABLE 2-continued

| SEC kWh/t | Density kg/m³ | Bulk dm²/kg | Air res. Gurley s | Air per. Gurley μm/Pas | Klemm mm | Light scatt. m²/kg | L. abs. coeff. m²/kg | Opacity % | Brightness % | CHELAB L | a* | b* | Strength indent | Band stiff. μNm | Grammage g/m² |
|---|---|---|---|---|---|---|---|---|---|---|---|---|---|---|---|
| 0 | 625 | 1.60 | 2.3 | 59 | | 28.5 | 0.05 | 68.4 | 89.4 | | | | 897 | | 64.4 |
| 50 | 697 | 1.43 | 4.8 | 28 | | 23.5 | 0.05 | 64.7 | 88.5 | | | | 1118 | | 66.1 |
| 125 | 739 | 1.35 | 14 | 9.5 | | 20.2 | 0.04 | 60.6 | 87.8 | | | | 1129 | | 65.3 |
| 202 | 780 | 1.28 | 80 | 1.7 | | 17.7 | 0.04 | 57.4 | 87.5 | | | | 1090 | | 65.9 |
| | | | | | | INTERPOLATED | | | | | | | | | |
| 57 | 701 | 1.43 | 5.6 | 26.3 | | 23.2 | 0.05 | 64.3 | 88.5 | | | | 1119 | | 66.0 |
| 148 | 751 | 1.33 | 33.5 | 7.2 | | 19.5 | 0.04 | 59.7 | 87.7 | | | | 1117 | | 65.4 |
| 78 | 712 | 1.40 | 6.2 | 21.2 | | 22.3 | 0.05 | 63.2 | 88.2 | | | | 1122 | | 65.8 |
| 150 | 752 | 1.33 | 35.1 | 7.0 | | 19.4 | 0.04 | 59.6 | 87.7 | | | | 1116 | | 65.5 |
| 114 | 733 | 1.37 | 12.7 | 12.1 | | 20.7 | 0.04 | 61.2 | 87.9 | | | | 1127 | | 65.4 |
| 175 | 765 | 1.31 | 56.4 | 4.5 | | 18.6 | 0.04 | 58.6 | 87.6 | | | | 1103 | | 65.7 |
| 100 | 725 | 1.38 | 10.9 | 15.7 | | 21.3 | 0.04 | 62.0 | 88.0 | | | | 1125 | | 65.5 |
| 150 | 752 | 1.33 | 35.4 | 7.0 | | 19.4 | 0.04 | 59.6 | 87.7 | | | | 1116 | | 65.5 |
| 200 | 779 | 1.28 | 78.3 | 1.9 | | 17.8 | 0.04 | 57.5 | 87.5 | | | | 1091 | | 65.9 |

TABLE 3

| SEC kWh/t | SR rw. | CSF ml | WRV g/g | Tens. index Nm/g | Stretch % | TEA index J/g | T. stiff. index kNm/g | Elastic mod. GPa | Tear index mNm²/g | Burst index kPam²/g | Scott Bond J/m² | Zero-Span ind. wet Nm/g | dry Nm/g | Frct.tgh index Jm/kg | Ap. tens. index Nm/g | Z-strength kPa |
|---|---|---|---|---|---|---|---|---|---|---|---|---|---|---|---|---|
| 0 | 14.5 | 670 | 1.59 | 43.0 | 5.0 | 1.59 | 4.42 | 2.84 | 21.9 | | | | | | | 583 |
| 50 | 17.5 | 600 | 1.77 | 69.6 | 4.4 | 2.09 | 8.17 | 4.41 | 15.0 | | | | | | | 821 |
| 126 | 24.0 | 410 | 1.92 | 88.0 | 4.5 | 2.62 | 7.12 | 5.44 | 11.7 | | | | | | | 984 |
| 201 | 36.5 | 305 | 2.07 | 97.8 | 4.1 | 2.69 | 8.30 | 6.70 | 9.66 | | | | | | | 976 |
| | | | | | | INTERPOLATED | | | | | | | | | | |
| 52 | 17.6 | 597 | 1.77 | 70 | 4.4 | 2.1 | 6.2 | 4.43 | 14.9 | | | | | | | 825 |
| 141 | 26.6 | 436 | 1.96 | 90 | 4.4 | 2.0 | 7.4 | 5.70 | 11.3 | | | | | | | 982 |
| 50 | 17.5 | 600 | 1.77 | 69.6 | 4.4 | 2.1 | 6.2 | 4.41 | 15.0 | | | | | | | 821 |
| 108 | 22.5 | 500 | 1.89 | 83.8 | 4.4 | 2.5 | 8.9 | 5.20 | 12.5 | | | | | | | 946 |
| 157 | 29.3 | 400 | 1.98 | 92.2 | 4.3 | 2.6 | 7.6 | 5.97 | 10.8 | | | | | | | 981 |
| 79 | 20 | 550 | 1.83 | 76.7 | 4.4 | 2.3 | 6.5 | 4.90 | 13.7 | | | | | | | 884 |
| 131 | 25 | 457 | 1.93 | 88.8 | 4.4 | 2.6 | 7.2 | 5.54 | 11.5 | | | | | | | 983 |
| 161 | 30 | 391 | 1.99 | 92.7 | 4.3 | 2.7 | 7.7 | 6.04 | 10.7 | | | | | | | 980 |
| 100 | 21.8 | 613 | 1.87 | 81.9 | 4.4 | 2.4 | 6.8 | 5.10 | 12.8 | | | | | | | 930 |
| 150 | 28.1 | 416 | 1.97 | 91.2 | 4.3 | 2.6 | 7.5 | 5.86 | 11.0 | | | | | | | 961 |
| 200 | 36.3 | 307 | 2.07 | 97.7 | 4.1 | 2.7 | 8.3 | 6.68 | 9.7 | | | | | | | 976 |

| SEC kWh/t | Density kg/m³ | Bulk dm²/kg | Air res. Gurley s | Air per. Gurley μm/Pas | Klemm mm | Light scatt. m²/kg | L. abs. coeff. m²/kg | Opacity % | Brightness % | CHELAB L | a* | b* | Strength indent | Band stiff. μNm | Grammage g/m² |
|---|---|---|---|---|---|---|---|---|---|---|---|---|---|---|---|
| 0 | 643 | 1.58 | 2.7 | 50 | | 27.4 | 0.18 | 71.4 | 83.9 | | | | 942 | | 65.4 |
| 50 | 713 | 1.40 | 6.7 | 20 | | 21.9 | 0.20 | 66.5 | 81.5 | | | | 1044 | | 64.9 |
| 125 | 764 | 1.31 | 39 | 3.5 | | 18.4 | 0.22 | 62.6 | 79.4 | | | | 1032 | | 64.6 |
| 201 | 807 | 1.24 | 530 | 0.26 | | 16.0 | 0.22 | 59.5 | 77.6 | | | | 944 | | 65.0 |
| | | | | | | INTERPOLATED | | | | | | | | | |
| 52 | 715 | 1.40 | 7.4 | 19.8 | | 21.8 | 0.20 | 66.4 | 81.5 | | | | 1044 | | 64.9 |
| 141 | 773 | 1.29 | 139.2 | 2.8 | | 17.9 | 0.22 | 62.0 | 79.0 | | | | 1014 | | 64.7 |
| 50 | 713 | 1.40 | 6.7 | 20.0 | | 21.9 | 0.20 | 68.6 | 81.5 | | | | 1044 | | 64.9 |
| 108 | 753 | 1.33 | 31.5 | 7.3 | | 19.2 | 0.22 | 63.5 | 79.9 | | | | 1035 | | 64.7 |
| 157 | 783 | 1.28 | 247.3 | 2.1 | | 17.4 | 0.22 | 61.3 | 78.6 | | | | 996 | | 64.8 |
| 79 | 733 | 1.37 | 19.1 | 13.7 | | 20.5 | 0.21 | 65.0 | 80.7 | | | | 1040 | | 64.8 |
| 131 | 768 | 1.30 | 78.3 | 3.2 | | 18.2 | 0.22 | 62.4 | 79.3 | | | | 1025 | | 64.6 |
| 161 | 785 | 1.27 | 274.7 | 1.9 | | 17.3 | 0.22 | 61.1 | 78.6 | | | | 990 | | 64.8 |
| 100 | 747 | 1.34 | 28.2 | 9.0 | | 19.6 | 0.21 | 63.9 | 80.1 | | | | 1036 | | 64.7 |
| 150 | 778 | 1.25 | 200.5 | 2.4 | | 17.6 | 0.22 | 61.6 | 78.8 | | | | 1003 | | 64.7 |
| 200 | 807 | 1.24 | 523.5 | 0.3 | | 16.1 | 0.22 | 59.5 | 77.7 | | | | 946 | | 65.0 |

TABLE 4

| Sample | Side and direction | Number of tests | Reference pulp | Modified pulp |
|---|---|---|---|---|
| Grammage, g/m$^2$ *) | | | 59.5 | 58.9 |
| Bulking thickness, μm *) | | 5 | 84.8 | 76.8 |
| Standard deviation, μm | | | 2.0 | 0.9 |
| Apparent bulk-density, kg/m$^3$ *) | | 5 | 702 | 767 |
| Standard deviation, kg/m$^3$ | | | 17 | 9 |
| Bulk, cm$^3$/g *) | | | 1.42 | 1.30 |
| Standard deviation, cm$^3$/g | | | 0.03 | 0.02 |
| Tensile strength, kN/m *) | MD | 10 | 5.69 | 5.85 |
| Standard deviation, kN/m | | | 0.18 | 0.32 |
| Tensile strength, kN/m *) | CD | 10 | 2.25 | 2.51 |
| Standard deviation, kN/m | | | 0.10 | 0.12 |
| Tensile index, Nm/g *) | MD | 10 | 95.7 | 99.2 |
| Standard deviation, Nm/g | | | 3.1 | 5.4 |
| Tensile index, Nm/g *) | CD | 10 | 37.8 | 42.6 |
| Standard deviation, Nm/g | | | 1.7 | 2.0 |
| Stretch, % *) | MD | 10 | 1.7 | 1.9 |
| Standard deviation, % | | | 0.1 | 0.2 |
| Stretch, %*) | CD | 10 | 2.5 | 3.1 |
| Standard deviation, % | | | 0.3 | 0.3 |
| Tensile energy absorption, J/m$^2$ *) | MD | 10 | 64.2 | 75.6 |
| Standard deviation, J/m$^2$ | | | 6.5 | 10.3 |
| Tensile energy absorption, J/m$^2$ *) | CD | 10 | 41.1 | 58.9 |
| Standard deviation, J/m$^2$ | | | 5.7 | 7.7 |
| TEA index, J/g *) | MD | 10 | 1.08 | 1.28 |
| Standard deviation, J/g | | | 0.11 | 0.17 |
| TEA index, J/g *) | CD | 10 | 0.691 | 1.00 |
| Standard deviation, J/g | | | 0.096 | 0.13 |
| Tensile stiffness, kN/m *) | MD | 10 | 659 | 678 |
| Standard deviation, kN/m | | | 15 | 18 |
| Tensile stiffness, kN/m *) | CD | 10 | 277 | 311 |
| Standard deviation, kN/m | | | 12 | 12 |
| Tensile stiffness index, kNm/g *) | MD | 10 | 11.1 | 11.5 |
| Standard deviation, kNm/g | | | 0.3 | 0.3 |
| Tensile stiffness index, kNm/g *) | CD | 10 | 4.66 | 5.28 |
| Standard deviation, kNm/g | | | 0.20 | 0.20 |
| Modulus of elasticity, N/mm$^2$(of bulking thickn.) *) | MD | 10 | 7773 | 8832 |
| Standard deviation, N/mm$^2$ | | | 177 | 228 |
| Modulus of elasticity, N/mm$^2$(of bulking thickn.) *) | CD | 10 | 3269 | 4049 |
| Standard deviation, N/mm$^2$ | | | 139 | 157 |
| Bursting strength, kPa | | 20 | 245 | 268 |
| Standard deviation, kPa | | | 29 | 19 |
| Burst index, kPam$^2$/g | | 20 | 4.12 | 4.54 |
| Standard deviation, kPam$^2$/g | | | 0.49 | 0.32 |
| Tearing strength, mN *) | MD | 10 | 462 | 357 |
| Standard deviation, mN | | | 15 | 25 |
| Tearing strength, mN *) | CD | 10 | 624 | 466 |
| Standard deviation, mN | | | 38 | 15 |
| Tear index, mNm$^2$/g *) | MD | 10 | 7.77 | 6.06 |
| Standard deviation, mNm$^2$/g | | | 0.25 | 0.43 |
| Tear index, mNm$^2$/g *) | CD | 10 | 10.5 | 7.91 |
| Standard deviation, mNm$^2$/g | | | 0.6 | 0.25 |
| Internal bonding strength, modif.Scott, J/m$^2$ | MD | 10 | 335 | 572 |
| Standard deviation, J/m$^2$ | | | 25 | 36 |
| Internal bonding strength, modif.Scott, J/m$^2$ | CD | 10 | 330 | 548 |
| Standard deviation, J/m$^2$ | | | 17 | 35 |
| Ring crush resistance (RCT), kN/m | MD | 10 | 0.257 | 0.229 |
| Standard deviation, kN/m | | | 0.021 | 0.023 |
| Ring crush resistance (RCT), kN/m | CD | 10 | 0.305 | 0.288 |

What is claimed is:

1. A method of splitting hollow cellulosic fibers in a system for splitting the fibers, the method comprising the steps of:
   wetting the fibers;
   feeding the wet fibers to a gaseous flow;
   conducting the gaseous flow carrying the fibers surrounded by the gas through a throat of a venturi tube of the system;
   producing a drop in gaseous pressure in the throat of the venturi tube in order to cause a difference between a pressure inside of the fibers and a pressure of the gas outside of the fibers, and
   causing the fibers to split in a longitudinal direction, and to open a lumen inside the fibers.

2. The method The method according to claim 1, further comprising:
   feeding the wet fibers to the gaseous flow when the gaseous pressure is above atmospheric pressure.

3. The method according to claim 1, further comprising:
   bringing the fibers into a liquid suspension of 5 to 50% consistency, and
   feeding the fibers to the gaseous flow under the gaseous pressure.

4. The method according to claim 3, further comprising:
   (i) bringing the fibers into the liquid suspension,
   (ii) compressing the suspension with compressed air or steam, (iii) dewatering the suspension to a consistency range of 5 to 50%, and (iv) feeding the wet fibers to the gaseous flow under the gaseous pressure.

5. The method according to claim 3, wherein further comprising:

dewatering the fibers in the liquid suspension to a consistency range of 5 to 50%, alternatively feeding the fibers to a plurality of atmospheric pressure tanks, which are pressurized alternatively to a pressure above atmospheric pressure with compressed air, and feeding the wet fibers to the said gaseous flow as a batch process, and filling one of the atmospheric pressure tanks with the wet fibers, while pressurizing or depressurizing another of the atmospheric pressure tanks, and while emptying yet another of the atmospheric pressure tanks of the wet fibers into the gaseous flow.

6. The method according to claim 1, wherein said gaseous flow is air or steam.

7. The method according to claim 1, further comprising:

discharging the gaseous flow together with the wet fibers through the venturi tube to a space at an atmospheric pressure.

8. The method according to claim 1, further comprising:

ensuring the gaseous pressure inside the wet fibers before entering the throat of the venturi tube is in a range of 1 to 20 bar.

9. The method according to claim 1, further comprising:

pressurizing the fibers in a liquid suspension so that the pressure is in a range of 1 to 20 bar.

10. The method according to claim 1, further comprising:

constricting the gaseous flow at the throat of the venturi tube to a cross-sectional area of 2 to 40%, of a flow cross-section upstream of the venturi tube.

11. The method according to claim 1, further comprising:

selecting the fibers from a group consisting of unbleached or bleached chemical pulp, unbleached or bleached chemi-thermomechanical pulps (CTMP) or thermomechanical pulps (TMP), and recycled fibrous material.

12. The method as recited in claim 1, wherein the system further comprises:

a container for containing the wet fibers, a flow channel for conducting the gaseous flow, the flow channel being located upstream of the venture tube of the system, and issuing into the venturi tube, and the method further comprising:

pressurizing the container; and feeding the wet fibers from the container to the flow channel located upstream of the venturi tube.

13. The method as recited in claim 12, wherein the container of the system is a pressure chamber for holding the wet fibers, the method further comprising the steps of:

supplying the wetted fibers to the pressure chamber;

pressurizing the pressure chamber;

arranging the flow channel in the gaseous flow;

feeding the wet fibers from the container to the gaseous flow in the flow channel;

arranging the venturi tube downstream of the gaseous flow;

dropping to the pressure drop in the venturi tube in order to cause the pressure difference between a liquid inside and the gas outside of the hollow fibers carried by the gaseous flow, and causing the fibers to split in the longitudinal direction thereof, and arranging a receiving tank downstream of the venturi tube to collect the longitudinally split fibers.

14. The method as recited in claim 1, further comprising the steps of:

feeding a fibrous pulp of the wet fibers to the gaseous flow when the gaseous pressure is above atmospheric pressure; and treating the longitudinally split fibers with washing liquors.

15. The method as recited in claim 14, wherein the fibrous pulp is at least one of unbleached chemical pulp from a cooking process, unbleached CTMP, or TMP.

16. The method according to claim 14, wherein the fibrous pulp is at least one of bleached chemical pulp, bleached CTMP, bleached TMP, and bleached recycled pulp.

17. The method as recited in claim 1, further comprising the steps of:

feeding a pulp of the wet fibers to the gaseous flow when the gaseous pressure is above atmospheric pressure; and subjecting longitudinally split fibers to treatment with bleaching chemicals.

18. The method according to claim 17, washing unbleached cellulosic pulp from at least one of a cooking process, unbleached CTMP, unbleached TMP, and unbleached recycled pulp, and feeding the wet fibers of the cellulosic pulp to the gaseous flow.

19. The method according to claim 18, dewatering the washed pulp to a consistency range of 5 to 50%, and feeding the gaseous flow under the gaseous pressure.

20. The method according to claim 18, wherein the cellulosic pulp is at least one of unbleached chemical pulp, bleached chemical pulp, unbleached CTMP, bleached CTMP, the unbleached TMP, and bleached TMP.

21. The method according to claim 18, wherein the pulp comprises recycled cellulosic fibers.

22. The method as recited in claim 1, further comprising the steps of:

feeding a pulp of the wet fibers and at least one bleaching chemical to the gaseous flow when the gaseous pressure is above atmospheric pressure; and allowing the at least one bleaching chemical to react with the longitudinally split fibers.

23. The method as recited in claim 1, comprising the steps of:

feeding a pulp of the wet fibers and at least one reactive chemical to the gaseous flow when the pressure is above atmospheric pressure; and allowing the at least one chemical to react with the longitudinally split fibers.

24. The method of claim 1, further comprising:

conducting a mixture consisting of the fibers having lumens filled with liquid, and the gas surrounding the fibers to the throat of the venturi tube.

25. The method of claim 24, further comprising:

dropping the gaseous pressure at the throat of the venturi tube from 5 to 10 bar upstream of the throat to substantially an atmospheric pressure downstream of the throat, and splitting the fibers in the longitudinal direction thereof by creating the pressure difference of 5 to 10 bar between the inside and the outside of the fibers.

* * * * *